(12) United States Patent
Ady et al.

(10) Patent No.: US 10,448,215 B2
(45) Date of Patent: *Oct. 15, 2019

(54) COMMUNICATING LOCATION CHANGE INFORMATION

(71) Applicant: JIO, Inc., Chicago, IL (US)

(72) Inventors: Roger W. Ady, Chicago, IL (US); Adam John Kusey, Chicago, IL (US); Makarand Manohar Karvekar, Glenview, IL (US); David Edward Stude, Barrington, IL (US); Justin Douglas Eltoft, Pleasant Prairie, WI (US); Ivan Kolotov, Mountain View, CA (US); Bharat Sunkavally, Pleasonton, CA (US); Peter Gene Jansons, Elburn, IL (US)

(73) Assignee: JIO, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,618

(22) Filed: Dec. 27, 2018

(65) Prior Publication Data

US 2019/0141485 A1 May 9, 2019

Related U.S. Application Data

(63) Continuation-in-part of application No. 15/630,718, filed on Jun. 22, 2017, now Pat. No. 10,172,109.

(60) Provisional application No. 62/354,523, filed on Jun. 24, 2016.

(51) Int. Cl.
*H04W 4/029* (2018.01)
*H04L 12/863* (2013.01)

(52) U.S. Cl.
CPC ......... *H04W 4/029* (2018.02); *H04L 47/6215* (2013.01)

(58) Field of Classification Search
CPC .......... H04L 67/18; H04W 4/02; H04W 64/00
See application file for complete search history.

(56) References Cited

U.S. PATENT DOCUMENTS

| | | | |
|---|---|---|---|
| 5,652,571 A | 7/1997 | Shima | |
| 6,414,635 B1* | 7/2002 | Stewart | ..................... G01S 5/12 342/457 |
| 6,920,576 B2 | 7/2005 | Ehmann | |
| 7,085,950 B2 | 8/2006 | Ehmann | |
| 7,117,370 B2 | 10/2006 | Khan | |
| 8,130,761 B2 | 3/2012 | Winter | |
| 8,670,770 B2 | 3/2014 | Fitzgerald | |
| 9,264,843 B2 | 2/2016 | Huang | |

(Continued)

*Primary Examiner* — Babar Sarwar
(74) *Attorney, Agent, or Firm* — Garlick & Markison; Timothy W. Markison; Gary W. Grube

(57) ABSTRACT

A method includes determining to report location change information of a first computing device to a second computing device and sending the location change information to the second computing device utilizing an initial communication approach. The method further includes assigning a priority level of the location change information based on one or more environmental parameters. When the priority level of the location change information is greater than a priority threshold, the method further includes selecting a new communication approach and resending at least a portion of the location change information to the second computing device using the new communication approach.

16 Claims, 18 Drawing Sheets

(56) References Cited

U.S. PATENT DOCUMENTS

| | | | | |
|---|---|---|---|---|
| 9,642,529 B1* | 5/2017 | Siddiqui | ............... | A61B 5/0008 |
| 9,681,259 B1* | 6/2017 | Ortega | .................... | H04W 4/02 |
| 9,870,715 B2* | 1/2018 | Sadeh-Koniecpol | ........................ | G09B 19/00 |
| 2004/0229564 A1* | 11/2004 | Huang | .................... | G01S 19/03 |
| | | | | 455/41.2 |
| 2008/0040023 A1* | 2/2008 | Breed | .................. | B60N 2/2863 |
| | | | | 701/117 |
| 2009/0047972 A1* | 2/2009 | Neeraj | .................. | G06Q 10/10 |
| | | | | 455/456.1 |
| 2009/0100145 A1* | 4/2009 | Szeto | .................... | G06F 15/173 |
| | | | | 709/217 |
| 2010/0151887 A1* | 6/2010 | Bobier | .................. | G06Q 10/10 |
| | | | | 455/457 |
| 2010/0299060 A1* | 11/2010 | Snavely | ................. | G06Q 10/02 |
| | | | | 701/533 |
| 2010/0325194 A1* | 12/2010 | Williamson | ............ | H04W 4/02 |
| | | | | 709/203 |
| 2011/0106736 A1* | 5/2011 | Aharonson | .......... | G06Q 10/109 |
| | | | | 706/12 |
| 2013/0252591 A1* | 9/2013 | Sasaki | .................. | H04W 4/001 |
| | | | | 455/414.1 |
| 2014/0003373 A1* | 1/2014 | Hakola | ................. | H04W 48/16 |
| | | | | 370/329 |
| 2016/0049014 A1* | 2/2016 | Wells | .................... | G07B 15/02 |
| | | | | 705/13 |
| 2017/0104872 A1* | 4/2017 | Ristock | ............... | H04M 3/5125 |
| 2017/0164332 A1* | 6/2017 | Kim | ..................... | H04W 72/02 |
| 2017/0332192 A1* | 11/2017 | Edge | ....................... | H04W 4/02 |

* cited by examiner

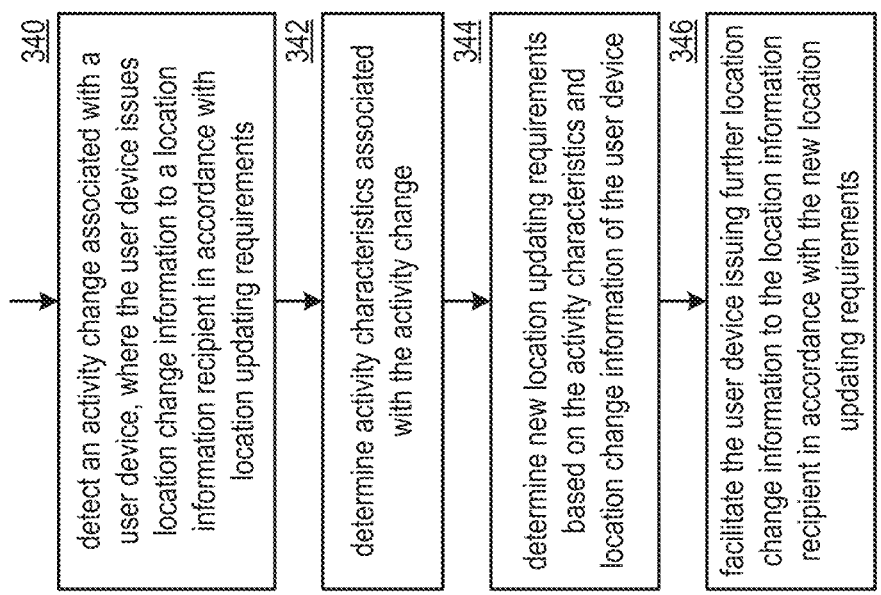

COMMUNICATING LOCATION CHANGE INFORMATION

CROSS REFERENCE TO RELATED PATENTS

The present U.S. Utility patent application claims priority pursuant to 35 U.S.C. § 120 as a continuation in part of U.S. Utility application Ser. No. 15/630,718, entitled "SYNCHRONIZING LOCATION STATUS INFORMATION IN A COMPUTING SYSTEM," filed Jun. 22, 2017, issuing as U.S. Pat. No. 10,172,109 on Jan. 1, 2019, which claims priority pursuant to 35 U.S.C. § 119(e) to U.S. Provisional Application No. 62/354,523, entitled "SYNCHRONIZING LOCATION STATUS INFORMATION IN A COMPUTING SYSTEM," filed Jun. 24, 2016, all of which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computing systems and more particularly to development of location context information for utilization by location driven functions of the computing systems.

Description of Related Art

The use of location information by location driven functions of computing systems is well known, where location information includes one or more of an absolute location (e.g., a global positioning satellite (GPS) derived location) and a relative location (e.g., with respect to a known location). Location driven functions includes a wide variety of applications including navigational aids (e.g., routes for driving, bicycling, walking, etc.), service delivery aids (e.g., vehicle route optimization, schedule adherence, etc.), retail shopping aids (e.g., proximity of available product, etc.), and safety and security aids (e.g., motorist assist, personal assist, asset tracking, people tracking, etc.).

The computing systems are known to include computing devices. Examples of the computing devices includes a smart phone, a tablet computer, a laptop computer, a vehicular computing device, a data storage server, and a data processing server. Basically, any device that includes a computing unit, one or more interfaces, and a memory system may be deemed as a computing device.

As is further known, the computing devices may be utilized to obtain location information associated with a particular computing device. In a self-determination approach, a computing device may determine location information associated with the computing device. In an assisted-determination approach, other computing devices may determine the location information associated with the computing device.

The self-determination approaches include receiving GPS signals and determining the location information, mapping received Wi-Fi hotspot identifiers to produce the location information, and mapping received Bluetooth beacon identifiers to produce the location information. The assisted-determination approaches include receiving wireless signals from the computing device (e.g., cellular, Wi-Fi, radiofrequency identifier (RFID) tag, Bluetooth, etc.) and analyzing the wireless signals utilizing a signal analysis approach. Signal analysis approaches include time of arrival, time difference of arrival, relative signal strength, triangulating utilizing a plurality of received wireless signals, and analysis of wireless network registration and site handover information (e.g., cellular site registration, cellular signal and timing metrics, Wi-Fi hotspot affiliation, etc.)

The location determining approaches are known to be associated with particular geographic regions and limitations. Examples of the geographic regions includes outdoors-centric with limited indoors and in-vehicle availability (e.g., GPS, other satellite-based location systems) and indoors-centric with limited location accuracy and limited availability (e.g., proximity to one or more Wi-Fi hotspots or Bluetooth beacons). Despite advances in location technologies, is widely recognized that there is not a single location technology to fit all applications (e.g., broad coverage of all geographic regions of interest).

It is well-known that communication of the location information to the location driven functions may be carried out by an associated communication technology and/or an adjunct communication technology. For example, a Wi-Fi message is the associated communication technology when the Wi-Fi hotspot identifier is utilized to produce the location information. As another example, a cellular communication system message is the adjunct communication technology when the GPS signals are utilized to produce the location information. Despite advances in communication technology, it is widely recognized that there is not a single communication technology to provide the communication of the location information in light of other desires beyond the communication of the location information (e.g., battery life of a portable computing device, network charges, equipment costs, indoor vs. outdoors, etc.).

JIO, Inc. introduced a computing system that utilizes unique combinations of location information determination and communication of the location information to the location driven functions to favorably support achieving requirements associated with equipment costs, network costs, location accuracy, location availability, user device size, and user device battery life. In particular, the computing system enables cost-effective tracking of a personal user device, where the personal user device has a very desirable form factor and battery life to promote ease-of-use and overall greater utility.

BRIEF DESCRIPTION OF THE SEVERAL VIEWS OF THE DRAWING(S)

Figure 8A:
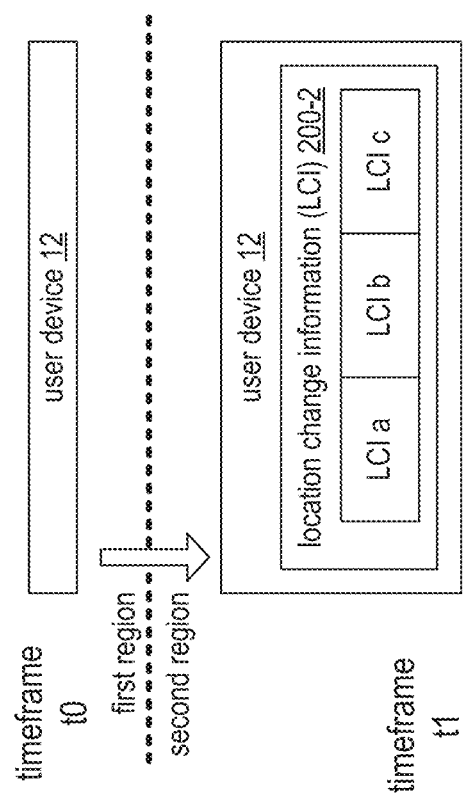
Figure 8B:
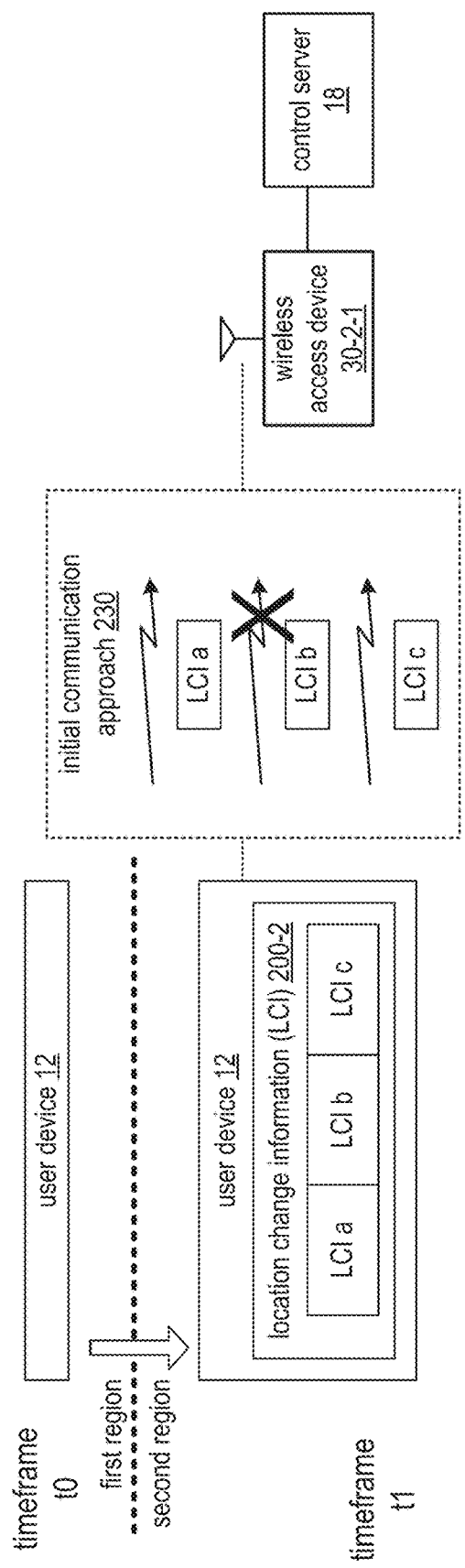
Figure 8C:
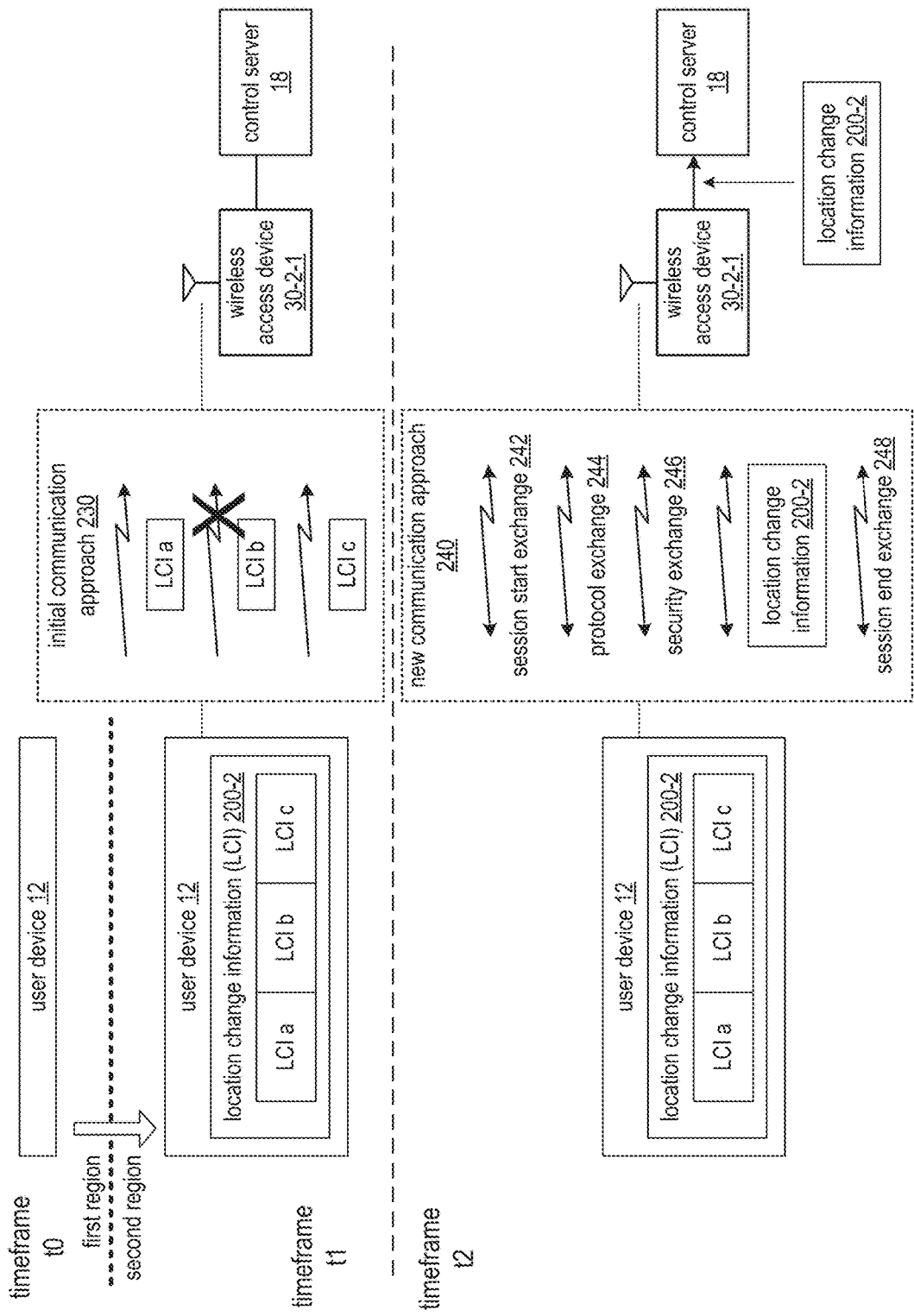
Figure 8D:
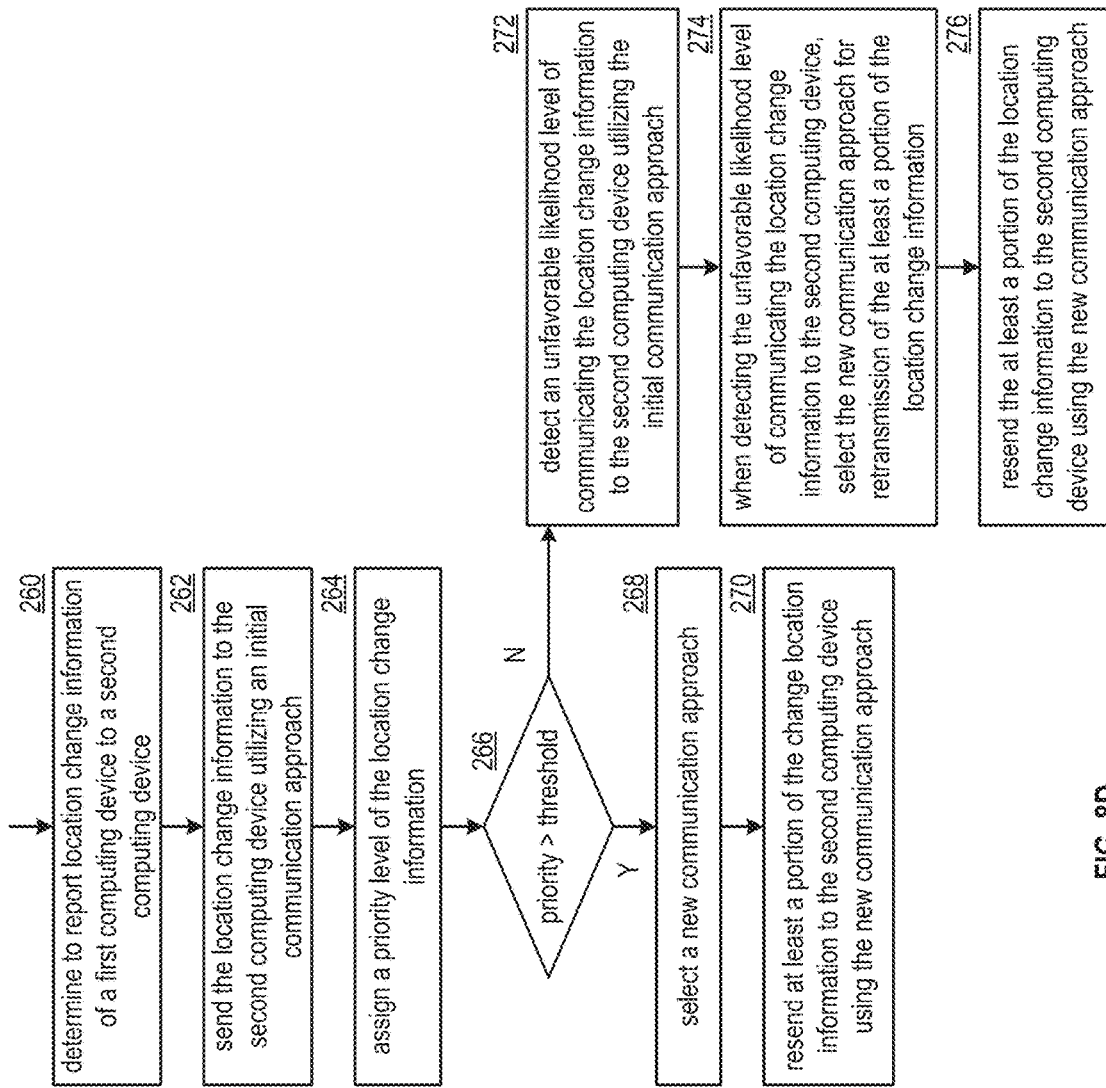
Figure 9A:
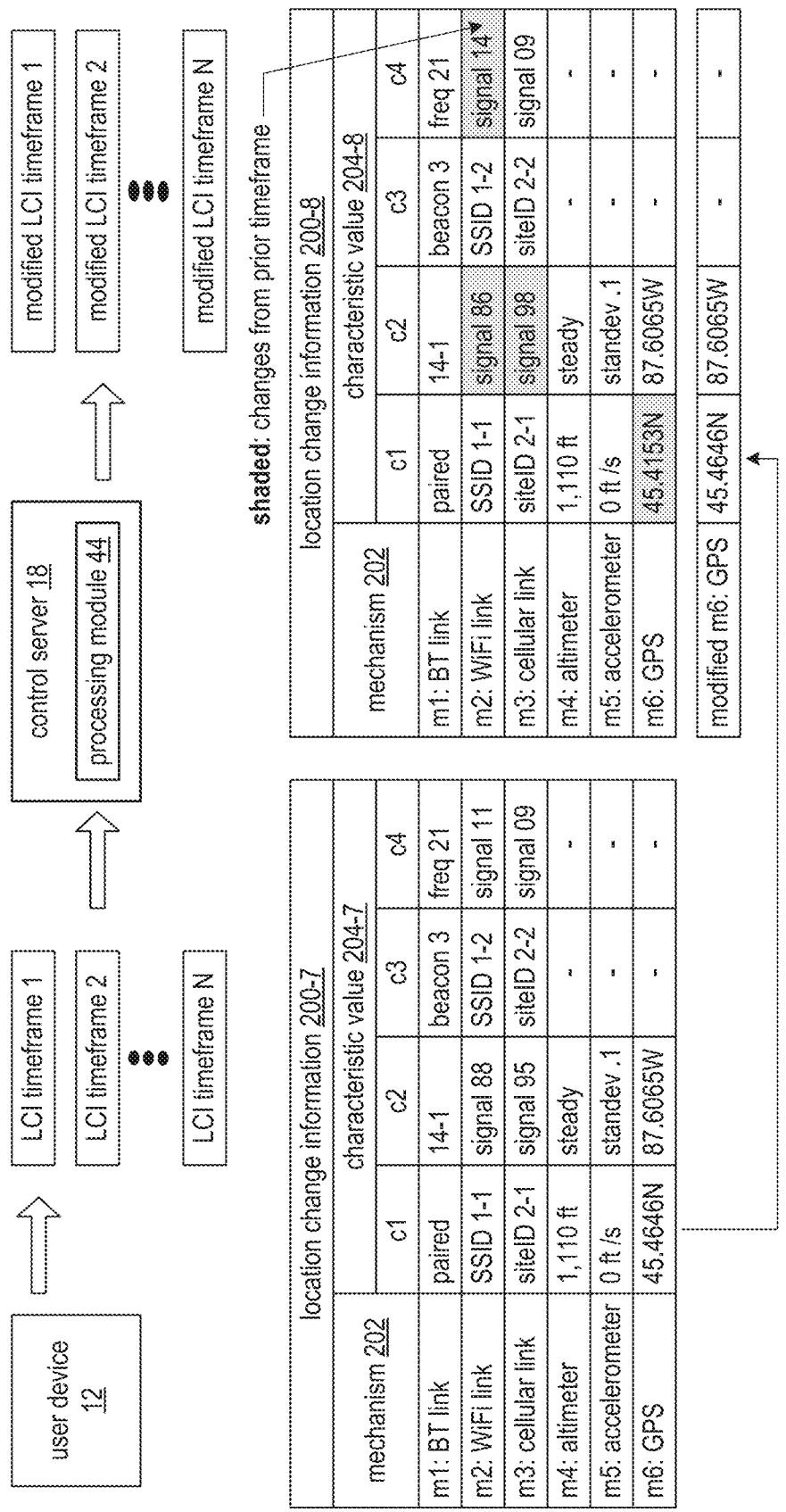
Figure 9B:
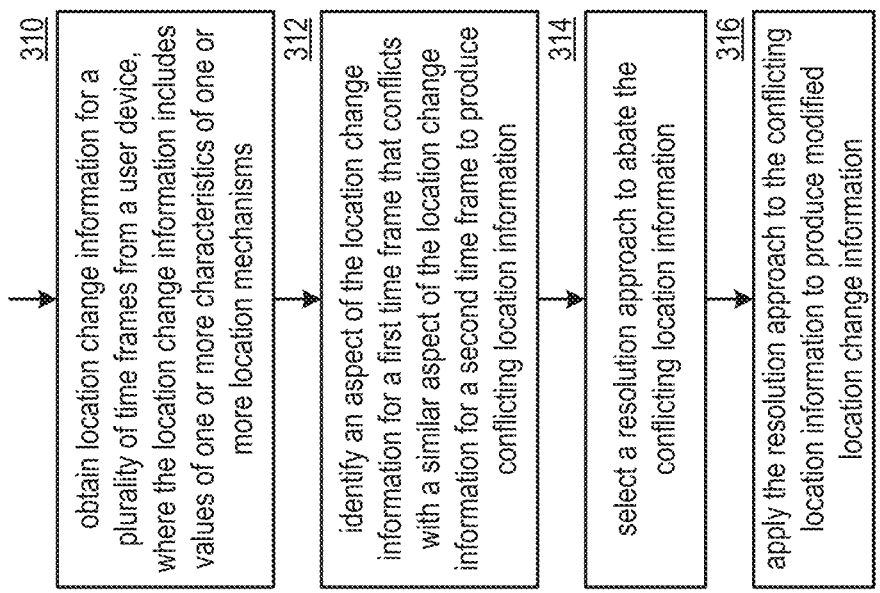
Figure 10A:
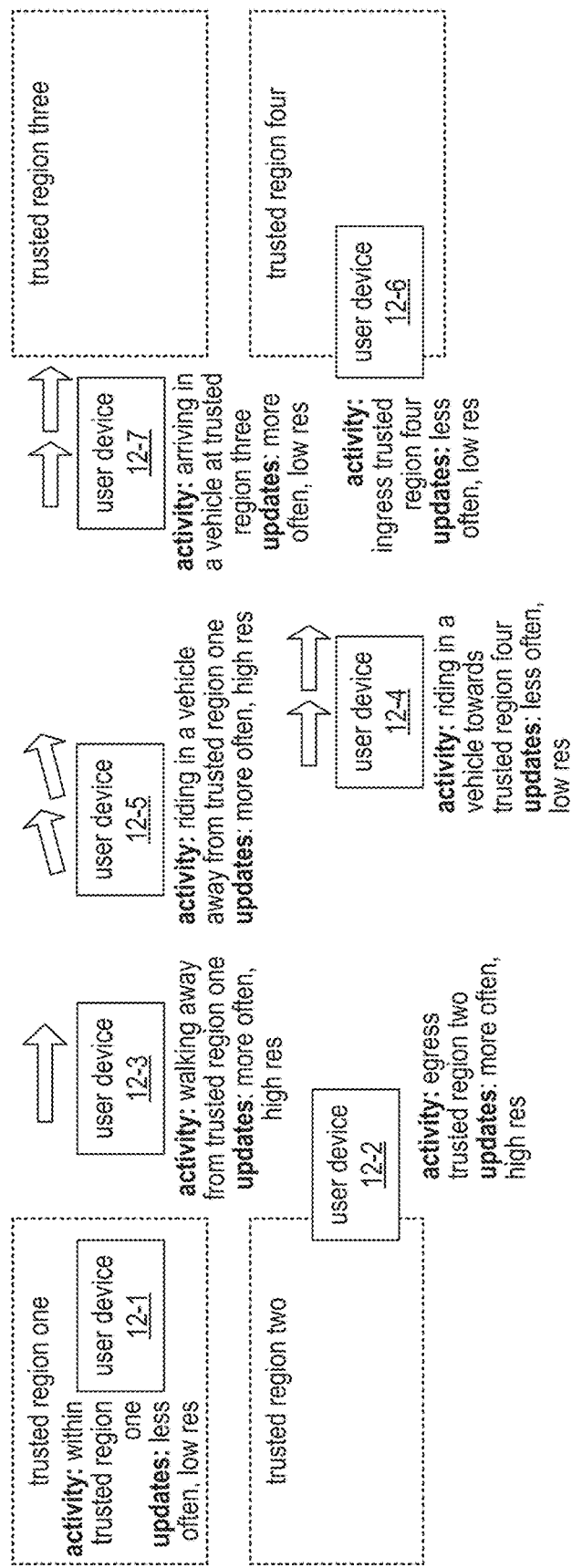
Figure 11A:
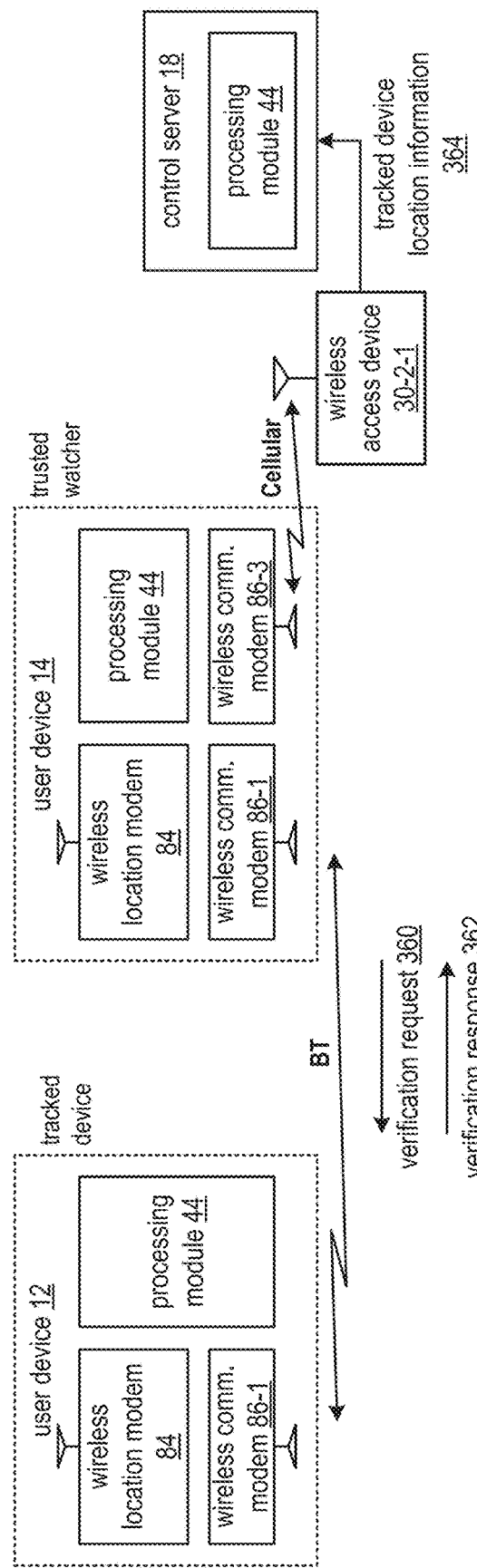
Figure 11B:
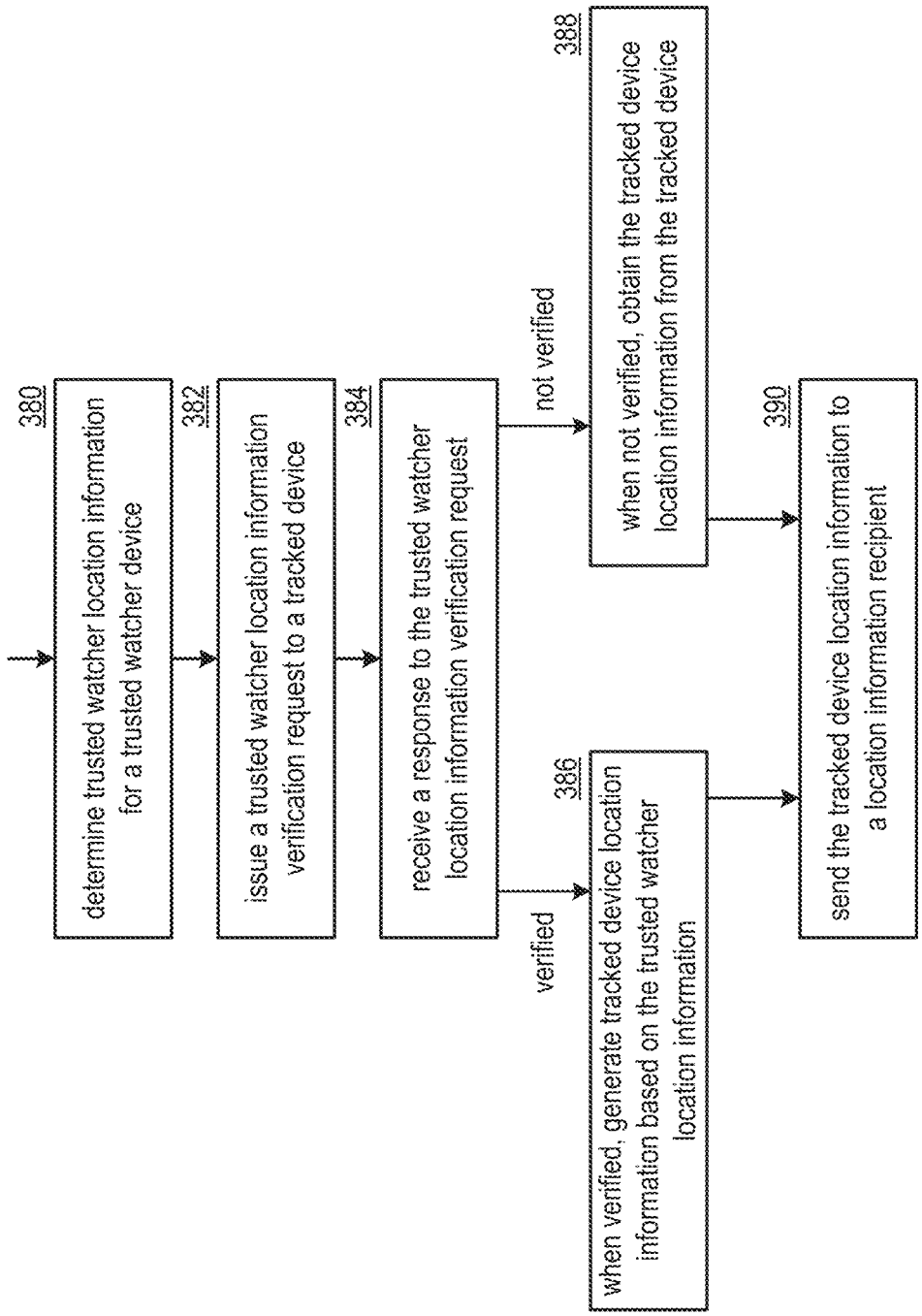

FIGS. 8A-C are schematic block diagrams of another embodiment of a computing system in accordance with the present invention;

FIG. 8D is a logic diagram of an embodiment of a method of communicating location change information change in a computing system in accordance with the present invention;

FIG. 9A is a schematic block diagram of another embodiment of a computing system in accordance with the present invention;

FIG. 9B is a logic diagram of an embodiment of a method of resolving conflicting location information in a computing system in accordance with the present invention;

FIG. 10A is a schematic block diagram of another embodiment of a computing system in accordance with the present invention;

FIG. 10B is a logic diagram of an embodiment of a method of adapting modes of location information synchronization in a computing system in accordance with the present invention;

FIG. 11A is a schematic block diagram of another embodiment of a computing system in accordance with the present invention; and FIG. 11B is a logic diagram of an embodiment of a method of verifying location information in a computing system in accordance with the present invention.

DETAILED DESCRIPTION OF THE INVENTION

Figure 1:
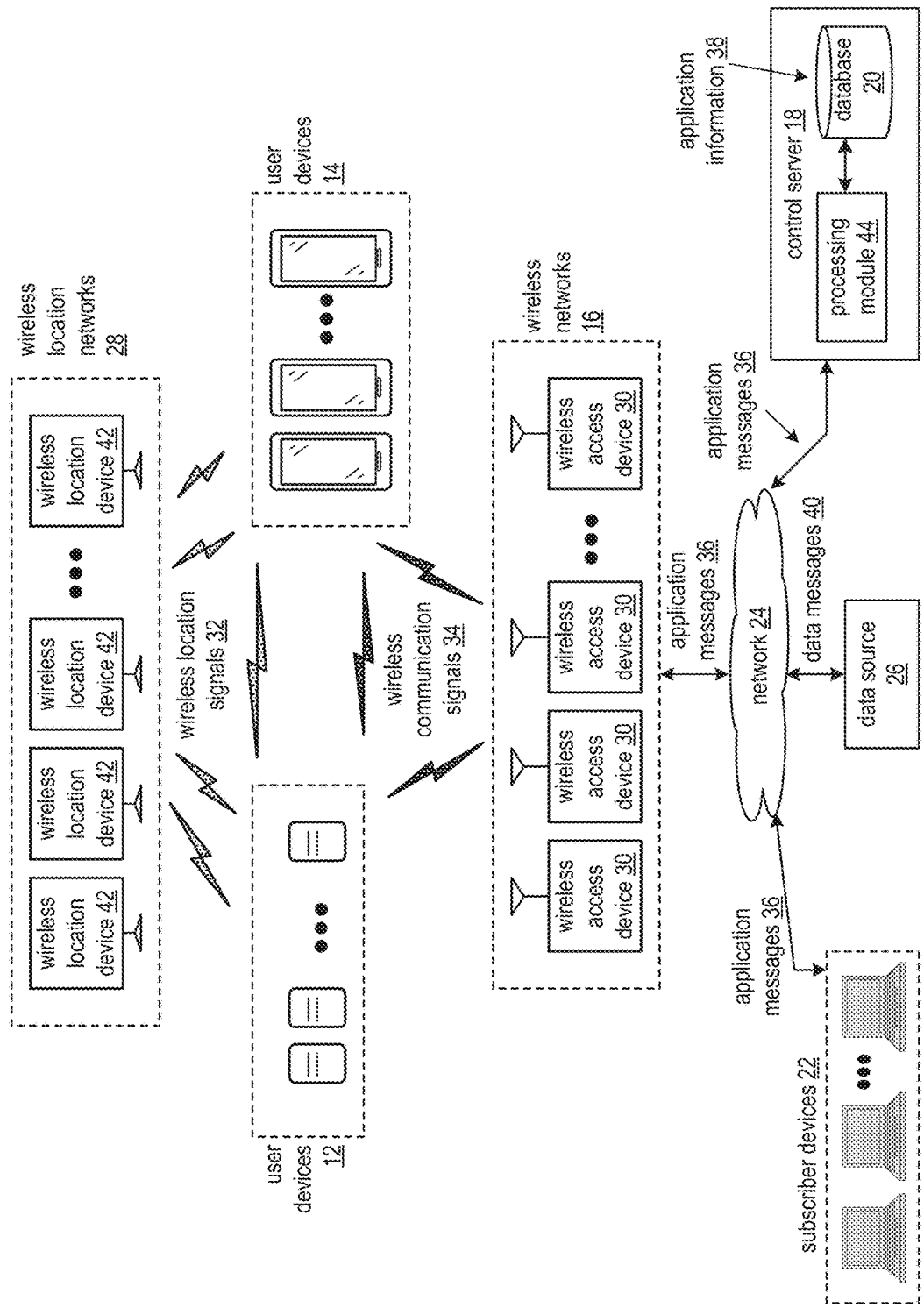
FIG. 1 is a schematic block diagram of an embodiment of a computing system in accordance with the present invention.

FIG. 1 is a schematic block diagram of an embodiment of a computing system 10 that includes wireless location networks 28, user devices 12, user devices 14, a wireless network 16, a control server 18, subscriber devices 22, a network 24, and a data source 26. The wireless location networks 28 includes a plurality of wireless location devices 42 that communicate wireless location signals 32 with the user devices 12 and 14. Each wireless location device 42 may be implemented utilizing one or more of a portion of a global positioning satellite (GPS) satellite constellation, a portion of a private location service, a wireless local area network (WLAN) access point, a Bluetooth (BT) beacon and/or communication unit, and a radiofrequency identifier (RFID) tag and/or transceiver. Each wireless location device 42 generates and transmits the wireless location signals 32 in accordance with one or more wireless location industry standards (e.g., including synchronize timing information (i.e., GPS), and a geographic reference identifier (ID) (i.e., a beacon ID, a MAC address, an access point ID such as a wireless local area network SSID)).

The user devices 12 includes one or more user devices 12, where each user device 12 may be implemented utilizing one or more portable computing devices. Examples of portable computing devices includes an embedded clothing package, an asset tracking package, a computer dongle, embedded vehicular electronics, a smart phone, a tablet computer, a laptop, a handheld computer, and/or any other device that includes a computing core and is capable of operating in a portable mode untethered from a fixed and/or wired network. For example, a particular user device 12 is implemented utilizing the embedded clothing package, where the embedded clothing package is designed for ease of use within clothing (e.g., small size, lightweight, etc.). At least some of the user devices 12 may be capable to transmit the wireless location signals 32 to other user devices 12 and/or to at least some of the user devices 14.

The user devices 14 includes one or more user devices 14, where each user device 14 may be implemented utilizing one or more portable computing devices. For example, a particular user device 14 is implemented utilizing the smart phone, where the smart phone is designed for a wide variety of functionality (e.g., medium size, battery capacity to supply a color display and frequent wireless communications, etc.). At least some of the user devices 14 may be capable to transmit the wireless location signals 32 to the user devices 12 and/or to other user devices 14.

The wireless network 16 includes a plurality of wireless access devices 30. Each wireless access device 30 may be implemented utilizing one or more of a portion of a wireless communication network. Each wireless communications network includes one or more of a public wireless communication system and a private wireless communication system and may operate in accordance with one or more wireless industry standards including universal mobile telecommunications system (UMTS), global system for mobile communications (GSM), long term evolution (LTE), wideband code division multiplexing (WCDMA), and IEEE 802.11. For example, a first wireless access device 30 is implemented utilizing a base station of an LTE cellular network and a second wireless access device 30 is implemented utilizing a wireless LAN access point.

Each wireless communication network sends wireless communications signals 34 to the user devices 12 and 14 and receives wireless communications signals 34 from the user devices 12 and 14 to communicate application messages 36. The wireless communication signals 34 includes encoded forms of application messages 36 in accordance with the one or more wireless industry standards. The application messages 36 includes instructions and/or data associated with one or more location driven functions to be processed by one or more computing devices of the computing system 10. The user devices 12 and 14 may send and receive the wireless communications signals 34 directly between two or more user devices 12 and 14.

The components of the computing system 10 are coupled via the network 24, which may include one or more of wireless and/or wireline communications systems, one or more private communications systems, a public Internet system, one or more local area networks (LAN), and one or more wide area networks (WAN). For example, the network 24 is implemented utilizing the Internet to provide connectivity between the wireless network 16, the subscriber devices 22, the data source 26, and the control server 18.

The control server 18 includes at least one processing module 44 and a database 20. The processing module 44 processes the application messages 36 and maintain storage of application information 38 within the database 20. The application information includes one or more of user account information, user device recommendations, user device configuration information, and user device status information (e.g., information associated with one or more user devices 12 and 14). The user account information includes one or more of IDs, permissions, affinity relationships of individuals and groups, and privacy requirements. The user device recommendations include one or more of a location synchronization approach, a location determination approach, and a communications path approach (e.g., requirements, recommended identifiers of computing devices associated with wireless communication, recommended power levels, recommended paths). The user device configuration includes one or more of a reporting mode (e.g., autonomous, when requested, by exception, scheduled), reporting triggers, location format, status type reporting, required sensor data, wireless network list, other user device list, a wireless location network list, power consumption goals, backhaul assist limits for others, landmark information, geographic fence information, affiliated user device identifiers, etc. The user device status information includes one or more of a user ID, a user device ID, a location (e.g., absolute, relative, coordinates, address, etc.), an availability level, a user device battery remaining energy level, an average power consumption level, a schedule adherence indicator, a health indicator, and an emergency indicator.

The subscriber devices 22 includes one or more subscriber devices 22, where each subscriber device 22 may be implemented utilizing one or more of a portable computing device and a fixed computing device (e.g., a desktop computer, a cable television set-top box, an application server, an internet television user interface and/or any other fixed device that includes a computing device). Such a portable or fixed computing device may include one or more of a computing core (e.g., providing processing module functionality), one or more wireless modems, sensors, and one or more user interfaces. The subscriber device 22 communicates application messages 36 with the control server 18 and one or more of the user devices 12 and 14. For example, the subscriber device 22 obtains and processes the status information from the user device 12.

The data source 26 may be implemented utilizing one or more of a server, a subscription service, a website data feed, or any other portal to data messages 40 that provide utility for synchronization of the status information between the user device 12 and the subscriber device 22. Examples of the data source 26 includes one or more of a weather service, a screen scraping algorithm, a website, another database, a schedule server, a live traffic information feed, an information server, a service provider, and a data aggregator. The data messages 40 includes one or more of weather information, a user daily activity schedule (e.g., a school schedule, a work schedule, a delivery schedule, a public transportation schedule), real-time traffic conditions, a road construction schedule a community event schedule, a community event schedule, and other schedules associated with a user.

In general, and with respect to the synchronizing of status information between the user device 12 and the subscriber device 22 (e.g., providing current status information of the user device 12 within a desired time frame to the subscriber device 22), the computing system 10 supports four primary functions. The four primary functions includes determining an approach to the synchronizing of the status information (e.g., determining a location synchronization approach, determining a location determination approach), generating the status information (e.g., determining a current location of the user device 12, generating location synchronization information as the status information to include the current location), identifying a communication path to communicate the status information from the user device 12 to the subscriber device 22, and communicating the status information from the user device 12 to the subscriber device 22 utilizing the communication path.

The first primary function includes the computing system 10 determining the approach to synchronize the status information. In an example of operation of the determining the approach to synchronize the status information, the user device 12 obtains a location synchronization approach. The location synchronization approaches include performing regularly scheduled updates, by exception (i.e., off schedule, outside of a particular geographic region, movement, motion pattern trigger, emergency trigger), transport mode (i.e., walk, bicycle, car, air), when in proximity to a waypoint, when in proximity, or not, to a particular assisting entity (i.e., a user device 14 that can help with location determination and communication), upon request, when a location determination approach exceeds a high threshold level of expected performance (i.e., very low power required to gather and report location), proximity to other known user devices 12. The obtaining of the location synchronization approach may be based on one or more of a predetermination, guidance from the subscriber device, a current location, a current status of the user device 12 (i.e., needs help, normal). For example, the user device 12 determines to synchronize the status information when detecting an unfavorable schedule adherence (e.g., a current location is ahead or behind a predetermined schedule). Alternatively, the processing module 44 determines the approach to synchronize the status information.

Having obtained the location synchronization approach, the user device 12 obtains a location determination approach. The location determination approach includes one or more of autonomously determining a current location, facilitating an assisted approach utilizing other computing devices of the computing system 10, one or more technology types (e.g., GPS, SSID, beacon, MAC address), and utilizing a last known location. The obtaining may be based on one or more of the location synchronization approach, availability of one or more location assets (e.g., to assist), requirements of the location determination approach (e.g., accuracy level, relative location versus absolute location, power requirements, priority level), a predetermination, and interpretation of guidance from the subscriber device 22, and selecting an approach that produces location information most favorably in accordance with the requirements. For example, the user device 12 determines to utilize GPS location information from a user device 14 when detecting proximity of the user device 14 and where the user device 14 generates acceptable location information. Alternatively, the processing module 44 determines the location determination approach.

The second primary function includes the computing system 10 generating the status information. In an example of operation of the generating of the status information, the user device 12 interprets wireless location signals 32 from the wireless location networks 28 to produce an absolute location associated with the user device 12 (e.g., a GPS-based location), interprets a user input to produce a status associated with a user of the user device (e.g., I'm okay pushbutton), and produces the status information to include the status associated with the user and the absolute location associated with the user device. As another example, the user device 12 interprets at least one of a wireless location signal 32 from a user device 14 and a wireless communication signal 34 from the user device 14 to produce a relative location association between the user device 14 and with the user device 12 (e.g., within a Bluetooth and/or Wi-Fi range proximity of the user device 14, based on signal strength, an absolute GPS location of the user device 14), interprets the user input to produce the status associated with the user, and produces the status information to include the status associated with the user and the relative location.

As yet another example of the generating of the status information, the user device 12 interprets another wireless location signal 32 from a wireless location device 42 to produce a relative location associated with the wireless location device 42 (e.g., within a Wi-Fi range proximity of the wireless location device 42, and absolute location of the wireless location device 42 based on interpreting a Wi-Fi mapping), interprets the user input to produce the status associated with the user, and produces the status information to include the status associated with the user and the relative location of the wireless location device 42. Alternatively, or in addition to, the user device 12 may utilize wireless location signals 32 from a plurality of wireless location devices 42 and user devices 14 to produce the status information. For example, the user device 12 receives a wireless communication signal 34 from a first user device 14, receives a wireless communication signal 34 from a second user device 14, receives another wireless communication signal 34 from a third user device 14, and estimates an absolute location of the user device 12 based on the received signals (e.g., triangulate).

The third primary function includes the computing system 10 identifying the communication path to synchronize the status information. In an example of operation of the identifying the communication path, the user device 12 identifies the communication path for communication of the status information (e.g., including the location synchronization information) to each of one or more synchronization entities (i.e., to one or more subscriber devices and/or user devices 14 either directly or via one or more intermediate communication nodes). Examples of the communication path include direct from the user device 12 to a wireless access device 30, and indirect via one or more user devices 14 and/or one or more other user devices 12 (e.g., a temporary mesh network).

The identifying of the communication path includes or more of identifying the synchronization entities (i.e., via a list, interpreting a query response), identifying other user devices 12 to aggregate location synchronization information, interpreting a communication path test result, interpreting path history (e.g., a last utilized communication path), identifying preferred intermediate communication nodes (e.g., a series of user devices 12), estimating required costs (e.g., wireless network 16) and/or power requirements for each of one or more identified paths (e.g., potential battery remaining energy level degradation for the user device 12, other user devices 12, and one or more user devices 14), determining a communication path status (i.e. active/inactive), generating a ranking of the one or more identified communication paths based on requirements of the communications path (e.g., select a highest ranked communications path with regards to matching requirements). For example, the user device 12 identifies another user device 12 with a higher level of remaining stored battery energy to serve as an intermediate node, and identifies a user device 14 within wireless communication signals range of the other user device 12, where the user device 14 is favorably operably coupled via wireless communication signals 34 to a wireless access device 30, and where the wireless access device 30 is actively operably coupled to the control server 18 and to a subscriber device 22 via the network 24. As another example, the user device 12 identifies another user device 14 within wireless communication signals range of the user device 12, where the user device 14 indicates that user device 14 is identified to aggregate status information from device 12 and at least one other user device 12 for communication of the aggregated status information via wireless communication signals 34 to the wireless access device 30 etc.

The fourth primary function includes the computing system 10 communicating the status information. In an example of operation of the communicating the status information, the user device 12 facilitates, for each synchronization entity, communication of the location synchronization information utilizing an identified associated communication path in accordance with the location synchronization approach. The facilitating includes one or more of generating an application message 36 for encoding utilizing wireless communication signals 34, where the application message 36 includes one or more of an identifier of the user device 12, location coordinates, a location address, a geographic location identifier, an identifier of a wireless location device, and an identifier of an associated user device 14; and transmitting the wireless communication signals 34 in accordance with the associated communication path synchronization entity (e.g., to the user device 14, forwards to the wireless access device 30, forwards to the subscriber device 22, and may replicate the application message to send the replicated application message to the control server 18). Having received of the status information including the location securitization information, the subscribed device 22 may display the status information. Alternatively, or in addition to, when receiving the application message 36, the processing module 44 stores the status information with a timestamp as application information 38 in the database 20.

Alternatively, or in addition to, the subscriber device 22 facilitates storing of application information including one or more of the user account information, the user device recommendations, and the user device configuration in the database 20. For example, the subscriber device 22 identifies a particular user device 12 for association with the subscriber device 22, establishes privacy requirements (e.g., restrictions on communicating status information), identifies a plurality of user devices 14 associated with trusted watchers (e.g., users of the user devices 14 with an affiliation with the particular user device 12, i.e., family members of a child associated with the user device 12), a desired number of days of battery life between recharging (i.e., power requirements), a daily schedule (i.e., a school schedule and after school schedule associated with the child), and an indication to synchronize the status information upon exceptions to the school and afterschool schedules as the location synchronization approach. Having updated the database 20, the processing module 44 may transmit a portion of the updated database 20 to the user device 12 to facilitate operation of the user device 12 utilizing one or more elements of the application information.

Figure 2:
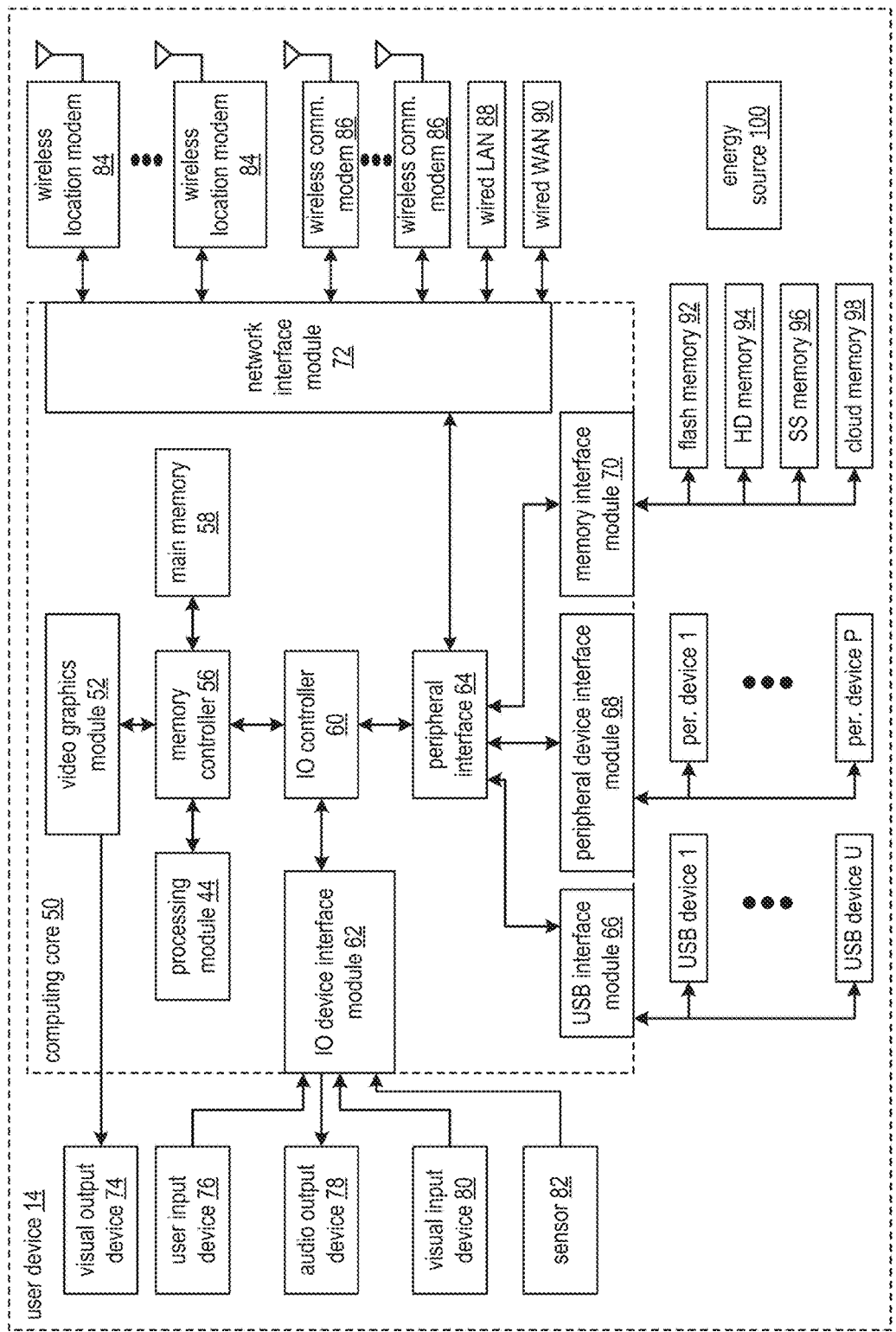
FIG. 2 is a schematic block diagram of an embodiment of user device of a computing system in accordance with the present invention.

FIG. 2 is a schematic block diagram of an embodiment of the user device 14 of the computing system 10 that includes a computing core 50, a visual output device 74 (e.g., a display screen, a light-emitting diode), a user input device 76 (e.g., keypad, keyboard, touchscreen, voice to text, etc.), an audio output device 78 (e.g., a speaker, a transducer, a motor), a visual input device 80 (e.g., a photocell, a camera), a sensor 82 (e.g., an accelerometer, a velocity detector, electronic compass, a motion detector, electronic gyroscope, a temperature device, a pressure device, an altitude device, a humidity detector, a moisture detector, an image recognition detector, a biometric reader, an infrared detector, a radar detector, an ultrasonic detector, a proximity detector, a magnetic field detector, a biological material detector, a radiation detector, a mass and/or weight detector, a density detector, a chemical detector, a fluid flow volume detector, a DNA detector, a wind speed detector, a wind direction detector, a motion recognition detector, and a battery level detector), one or more universal serial bus (USB) devices 1-U, one or more peripheral devices, one or more memory devices (e.g., a flash memory device 92, one or more hard drives 94, one or more solid state (SS) memory devices 96, and/or cloud memory 98), an energy source 100 (e.g., a battery, a generator, a solar cell, and a fuel cell), one or more wireless location modems 84 (e.g., a GPS receiver, a Wi-Fi transceiver, a Bluetooth transceiver, etc.), one or more wireless communication modems 86 (e.g., 4G cellular), a wired local area network (LAN) 88, and a wired wide area network (WAN) 90

The computing core 50 includes a video graphics module 52, one or more processing modules 44, a memory controller 56, one or more main memories 58 (e.g., RAM), one or more input/output (I/O) device interface modules 62, an input/output (I/O) controller 60, a peripheral interface 64, one or more USB interface modules 66, one or more network interface modules 72, one or more memory interface modules 70, and/or one or more peripheral device interface modules 68. Each of the interface modules 62, 66, 68, 70, and 72 includes a combination of hardware (e.g., connectors, wiring, etc.) and operational instructions stored on memory (e.g., driver software) that is executed by the processing module 44 and/or a processing circuit within the interface module. Each of the interface modules couples to one or more components of the user device 14. For example, one of the IO device interface modules 62 couples to an audio output device 78. As another example, one of the memory interface modules 70 couples to flash memory 92 and another one of the memory interface modules 70 couples to cloud memory 98 (e.g., an on-line storage system and/or on-line backup system).

The main memory 58 and the one or more memory devices include a computer readable storage medium that stores operational instructions that are executed by one or more processing modules 44 of one or more computing devices (e.g., the user device 14) causing the one or more computing devices to perform functions of the computing system 10. For example, the processing module 44 retrieves the stored operational instructions from the HD memory 94 for execution.

Figure 3:
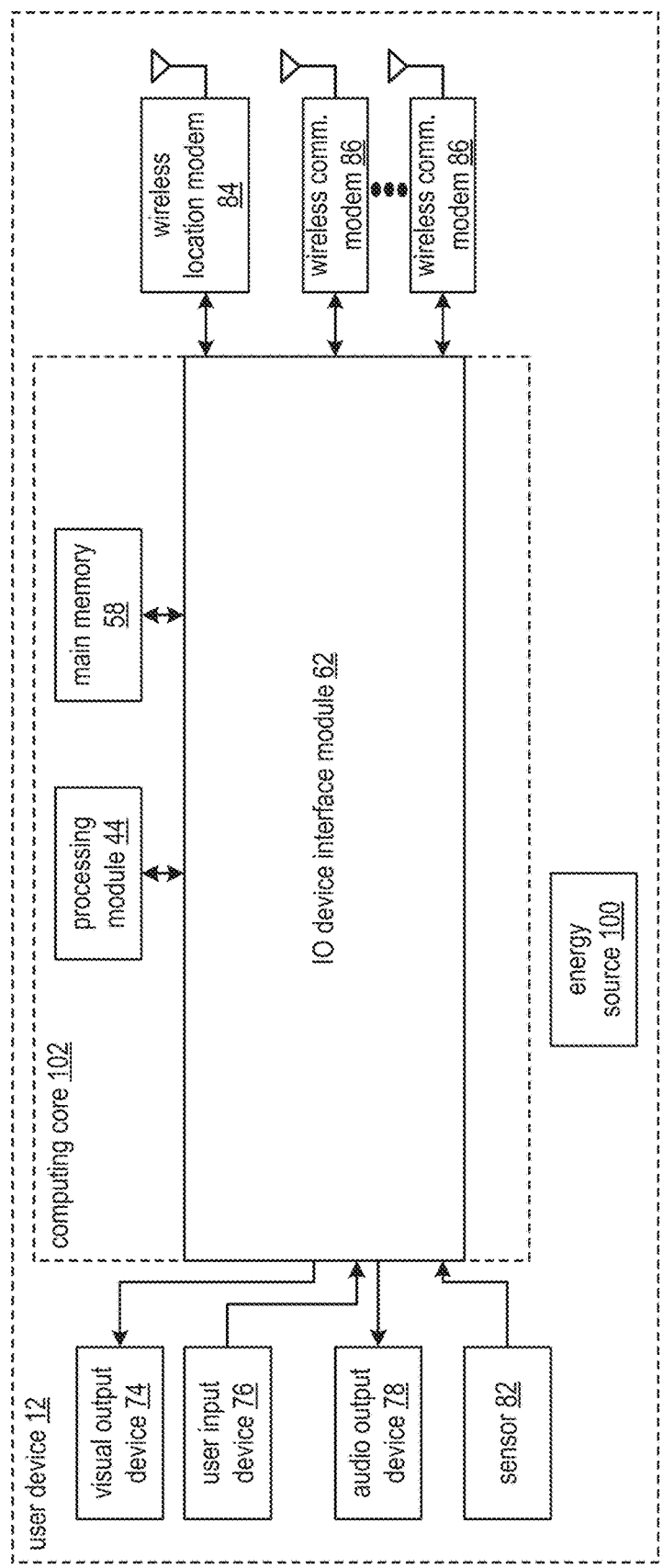
FIG. 3 is a schematic block diagram of another embodiment of user device of a computing system in accordance with the present invention.

FIG. 3 is a schematic block diagram of another embodiment of the user device 12 of the computing system 10 that includes a computing core 102, and elements of the user device 14 (e.g., FIG. 2), including one or more of the visual output device 74, the user input device 76, the audio output device 78, the sensor 82, the energy source 100, the wireless location modems 84, and the plurality of wireless communication modems 86. The computing core 102 includes the I/O device interface module 62 of FIG. 2, the main memory 58 of FIG. 2, and the processing module 44 of FIG. 2. The user device 12 may be constructed to provide functionality to determine and communicate the status information in a cost-effective and low-power way. For example, the visual output device 74 is implemented to include a multicolor LED, the user input device 76 includes a switch, the audio output device 78 includes APs electric speaker, the sensor 82 includes a motion sensor and a battery level detector, the energy source 100 includes small form factor rechargeable batteries, the wireless location modem 84 includes a low-power GPS receiver, a first wireless communication modem 86 includes a Wi-Fi transceiver, and a second wireless communication modem 86 includes a Bluetooth transceiver.

Figure 4:
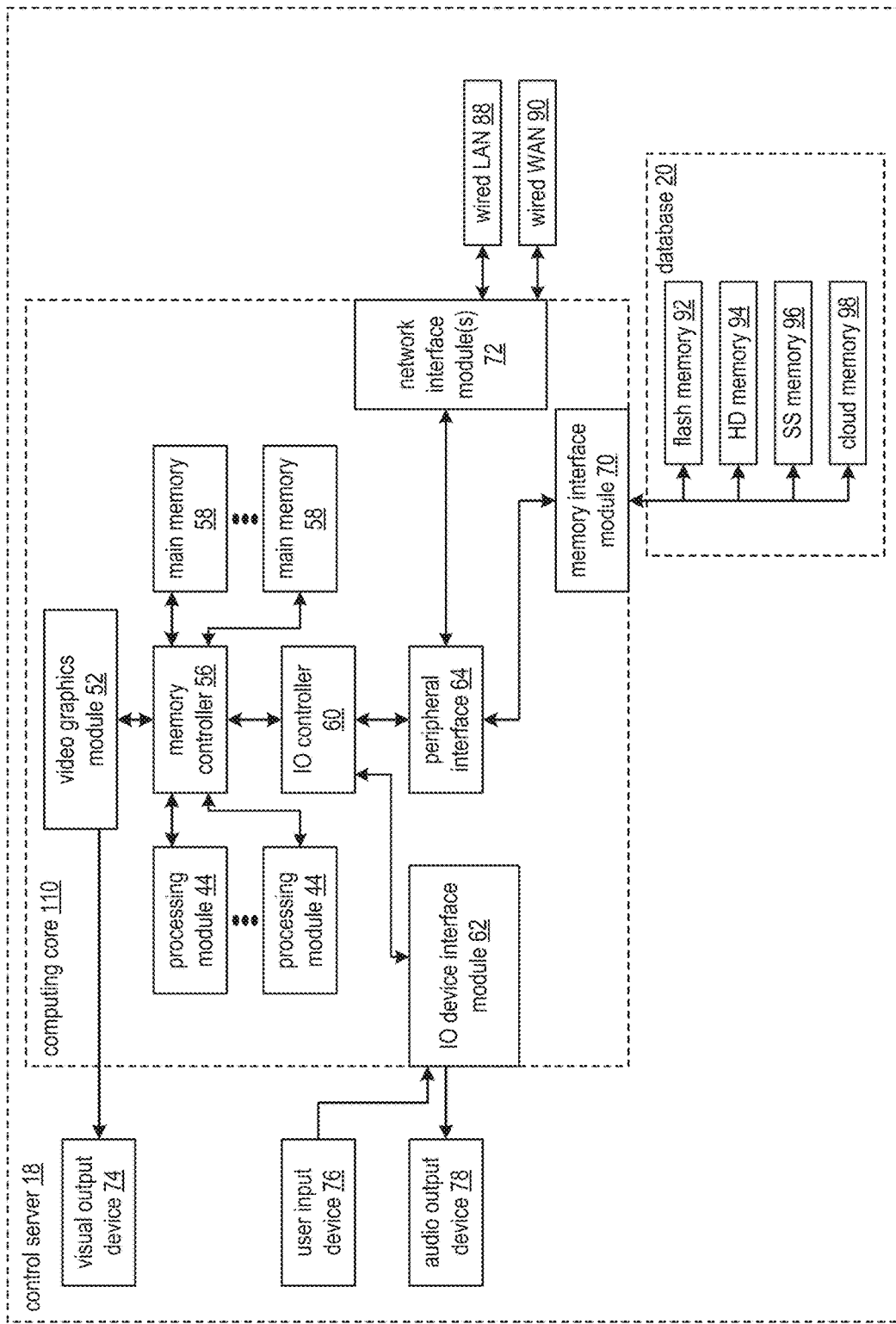
FIG. 4 is a schematic block diagram of an embodiment of a control server of a computing system in accordance with the present invention.

FIG. 4 is a schematic block diagram of an embodiment of the control server 18 of the computing system 10 that includes a computing core 110 and elements of the user device 14 (e.g., FIG. 2), including one or more of the visual output device 74, the user input device 76, the audio output device 78, the memories 92-98 to provide the database 20 of FIG. 1, the wired LAN 88, and the wired WAN 90. The computing core 110 includes elements of the computing core 50 of FIG. 2, including the video graphics module 52, the plurality of processing modules 44, the memory controller 56, the plurality of main memories 58, the input-output controller 60, the input-output device interface module 62, the peripheral interface 64, the memory interface module 70, and the network interface modules 72.

Figure 5:
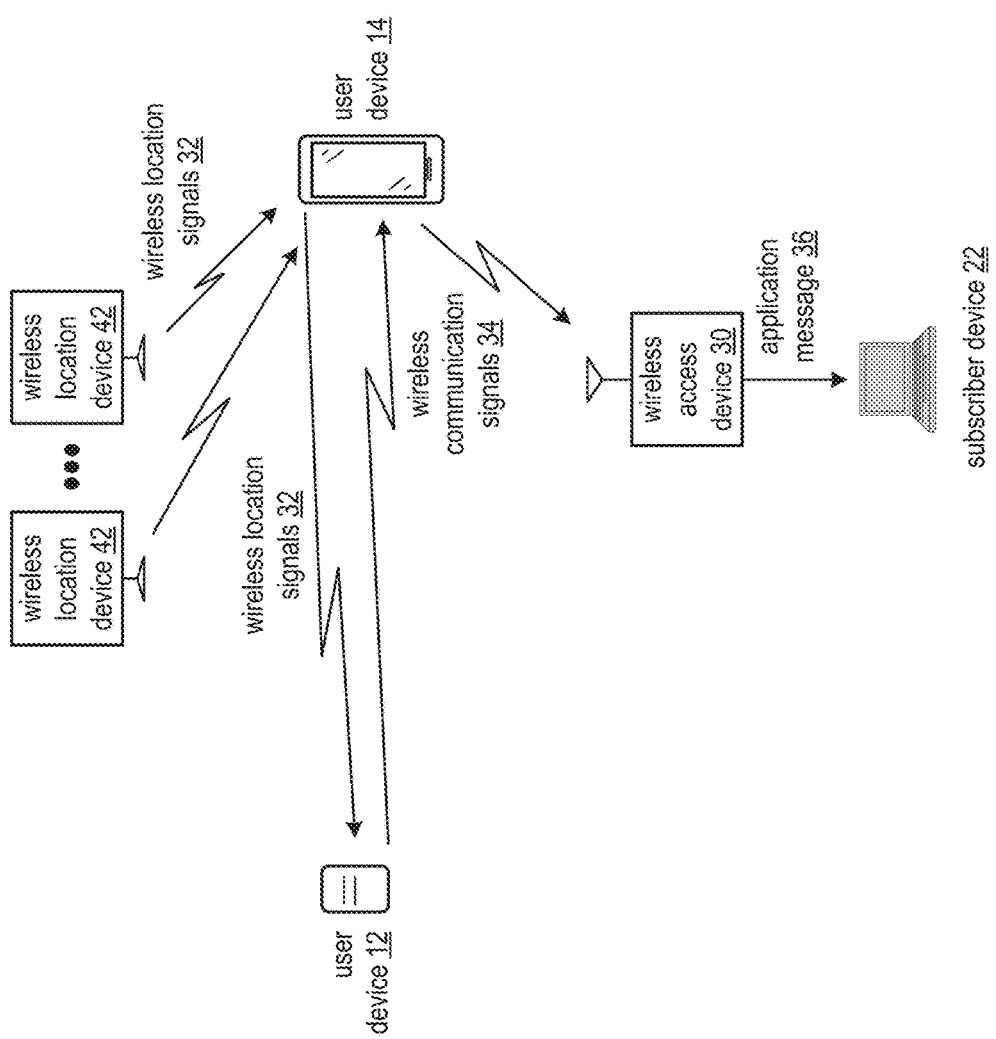
FIG. 5 is a schematic block diagram of another embodiment of a computing system in accordance with the present invention.

FIG. 5 is a schematic block diagram of another embodiment of a computing system that includes a plurality of wireless location devices 42 of FIG. 1, the user device 12 of FIG. 1, the user device 14 of FIG. 1, the wireless access device 30 of FIG. 1, and the subscriber device 22 of FIG. 1. The computing system functions to synchronize location status information, associated with the user device 12, to the subscriber device 22.

In an example of operation of the synchronization, the user device 12 obtains a location synchronization approach (e.g., under what circumstances to report location and status). The obtaining includes one or more of utilizing a predetermination (e.g., a default configuration), utilizing guidance from the subscriber device 22 (e.g., in accordance with a message from one or more of the control server 18 and the subscriber device 22), determining the approach based on a current location (e.g., update more often when not at home or school), determining the approach based on detecting other affiliated user devices 12 and/or one or more affiliated user devices 14 and determining the approach based on a current status of a user associated with the user device 12 (e.g., normal status, needs help, etc.). For example, the user device 12 determines to synchronize location and status every 10 minutes when there are no detectable affiliated user devices 12 and determines to synchronize the location and status every hour when at least one other affiliated user device 12 is detected (e.g., another family member is nearby).

Having obtained the location synchronization approach, the user device 12 obtains a location determination approach based on availability of location assets (e.g., available location determination assistance from one or more user devices 14, from one or more other user devices 12, and whether a GPS wireless location device 42 is detectable) and based on the location synchronization approach. The obtaining includes one or more of determining the applicability of a particular location determination approach with regards to the location synchronization approach (e.g., a required frequency of providing location updates may be too often to accommodate a particular location determination approach associated with a lengthy process to produce a location), establishing wireless connectivity with the location assets (e.g., receiving wireless location signals 32, receiving wireless communication signals 34), determining whether a particular location asset is able to provide assistance in determining the location, obtaining location requirements (e.g., from configuration information, from the subscriber device 22), where the requirements include one or more of absolute versus relative, location accuracy, power requirements for the location determination, and a priority level; utilizing the predetermination, and selecting an approach from two or more identified approaches that produces the location most favorably in accordance with the requirements. For example, the user device 12 determines to utilize a GPS location of the user device 14 to lower energy consumption of the user device 12 when the location determination requirements include minimize energy consumption guidance and allow utilization of a location proxy of a nearby location asset.

Having produced the location determination approach, the user device 12 facilitates generating the location synchronization information utilizing the location determination approach. For example, the user device 12 receives wireless location signals 32 from the user device 14, where the wireless location signals 32 includes a Bluetooth beacon identifying the user device 14 and GPS coordinates associated with the user device 14, where the user device 14 receives wireless location signals 32 from a plurality of wireless location devices 42 (e.g., GPS satellite constellation) to produce the GPS coordinates. The generating of the location synchronization information may further include the user device 12 reading a user input device (e.g., a push button switch, a motion detector) associated with the user device 12 to capture a current status associated with a user of the user device 12. When utilizing the current status, the user device 12 aggregates the location information and the current status reduce the location synchronization information.

Having generated the location synchronization information, the user device 12 identifies a communication path for communication of the location synchronization information to each of one or more synchronization entities (e.g., to the subscriber device 22 in accordance with configuration information). The identifying includes one or more of identifying the synchronization entities (e.g., from a list, based on one or more requests, in accordance with the configuration information), identifying location synchronization from at least one other user device 12 for aggregation (e.g., to save energy), interpreting a communication path test result (e.g., extracting latency, i.e., accrued time to deliver at least part of a message), energy requirements, error rates, etc.), interpreting communication path history (e.g., which path was favorably utilized most recently), identifying preferred intermediate communication nodes for potentially relaying the location synchronization information (e.g., detecting one or more user devices 14, detecting a wireless access device 30, detecting one or more user devices 12, detecting a virtual mesh network), estimating costs (e.g., network charges) estimating energy requirements, determining a communication path status (e.g., active/inactive), obtaining communication path requirements (e.g., from the configuration information, based on available energy levels of one or more user devices, based on the location synchronization approach), generating a ranking of two or more communication paths measuring favorability of communication path attributes to the communication path requirements, selecting a highest ranked communication path or a first communication attempt (e.g., potential utilizing next ranked communication paths upon failure of a current communication attempt).

As an example of the identifying of the communication path, the user device 12 selects a communication path that includes transmitting a wireless communication signal 34 from the user device 12 to the user device 14, where the user device 14 forwards an updated wireless communication signal 34 to the wireless access device 30 for communication of an application message 36 (e.g., that includes the location synchronization information) to the subscriber device 22. Alternatively, the user device 12 identifies a next ranked communication path that includes sending wireless communication signals 34 directly from the user device 12 to the wireless access device 30 (e.g., although with a higher level of energy consumption).

Having produced the location synchronization information and having identified the communication path, for each synchronization entity (e.g., the subscriber device 22), the user device 12 facilitates communication of the location synchronization information to the synchronization entity using an identified associated communication path in accordance with the location synchronization approach (e.g., timed appropriately). For example, the user device 12 generates communication path instructions (e.g., details of the communication path), encodes the location synchronization information and the communication path instructions to produce wireless communication signals 34 (e.g., status, GPS accordance of the user device 14, an indicator that the location of the user device 14 is a proxy for the location of the user device 12, an identifier the user device 12, identifiers of intermediate nodes of the communication path), and transmits the wireless communication signals 34 to the user device 14 in accordance with the identified communication path, where the user device 14 decodes the wireless communication signals 34 to reproduce the location synchronization information and updates the location synchronization information (e.g., adds an identifier of the user device 14, updates the encapsulated GPS location of the user device 14, aggregates other location synchronization from other user devices 12 and/or user devices 14) and encodes the updated location synchronization information to produce further wireless communication signals 34 for transmission to the wireless access device 30. When receiving the wireless communication signals 34, the wireless access device 30 decodes the application message 36 that includes the updated location synchronization information and sends the updated location synchronization information to the subscriber device 22 for further processing and/or display.

Alternatively, or in addition to, the user device 12 identifies a particular communication path to include a branch, where the location synchronization information follows the path for a first portion and then is split into two different branches to communicate replicated location synchronization information to two or more synchronization entities. For example, the user device 12 encodes the location synchronization information and communication path instructions to produce the wireless communication signals 34, sends the wireless communication signals 34 to the user device 14, where the user device 14 sends the further wireless communication signals 34 that includes the updated location synchronization information to the wireless access device 30, where the wireless access device 30 interprets communication path instructions to replicate the updated location synchronization information and where the wireless access device 30 sends the updated location synchronization information to the subscriber device 22 and sends the replicated updated location synchronization information to the control server 18 for further processing and/or storage.

Figure 6:
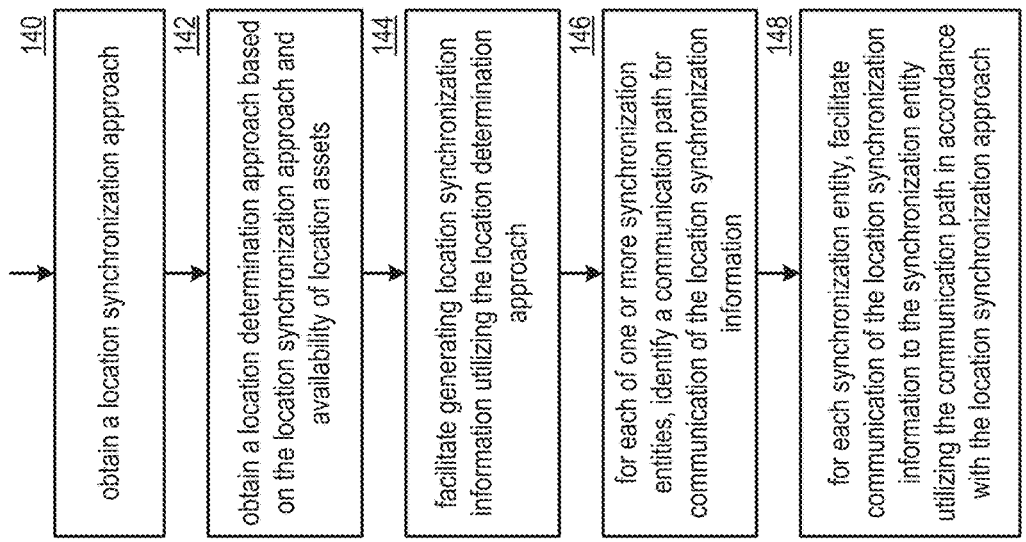
FIG. 6 is a logic diagram of an embodiment of a method of synchronizing locations status information in a computing system in accordance with the present invention.

FIG. 6 is a logic diagram of an embodiment of a method of synchronizing location status information in a computing system. The method includes step 140 where a processing module (e.g., of a first user device) obtains a location synchronization approach. The obtaining includes one or more of interpreting a predetermination, interpreting guidance from an associated subscriber device, basing the approach on a current location, and basing approach on a current status of a user of the user device.

The method continues at step 142 where the processing module obtains a location determination approach based on the location synchronization approach and availability of location assets. The determining may further be based on one or more of identification of requirements of the location determination approach, a predetermination, and interpretation of guidance from the subscriber device, and selecting of an approach that produces location information most favorably in accordance with the requirements of the location determination approach. The method continues at step 144 with a processing module facilitates generating location synchronization information utilizing the location determination approach.

For each of one or more synchronization entities, the method continues at step 146 for the processing module identifies a communication path for communication of the location synchronization information to the synchronization entity. The identifying includes one or more of identifying the synchronization entities (e.g., from a list), identifying other user devices to aggregate location synchronization information, interpreting a communication path test result, interpreting communication path history, identifying preferred intermediate communication nodes, estimating required costs, estimating energy consumption levels for each communication path, determining a communication path status level, generating a ranking of the one or more communication paths based on the requirements of the communication path, and selecting a highest ranked communication path.

For each synchronization entity, the method continues at step 148 where the processing module facilitates communication of the location synchronization information to the synchronization entity utilizing the communication path in accordance with the location synchronization approach. The facilitating includes generating an application message for encoding utilizing wireless communication signals, where the application message includes one or more of an identifier of the user device, location coordinates, a location address, a geographic location identifier, an identifier of a wireless communication device, communication path instructions (e.g., routing instructions), and an identifier of another user device. The facilitating further includes transmitting the wireless communication signals in accordance with the associated communication path to the synchronization entity via a first intermediate node of the communication path instructions. Alternatively, or in addition to, the processing module retransmits the wireless communication signals via a next ranked communication path when a favorable confirmation message is not received within a confirmation time frame.

Figure 7A:
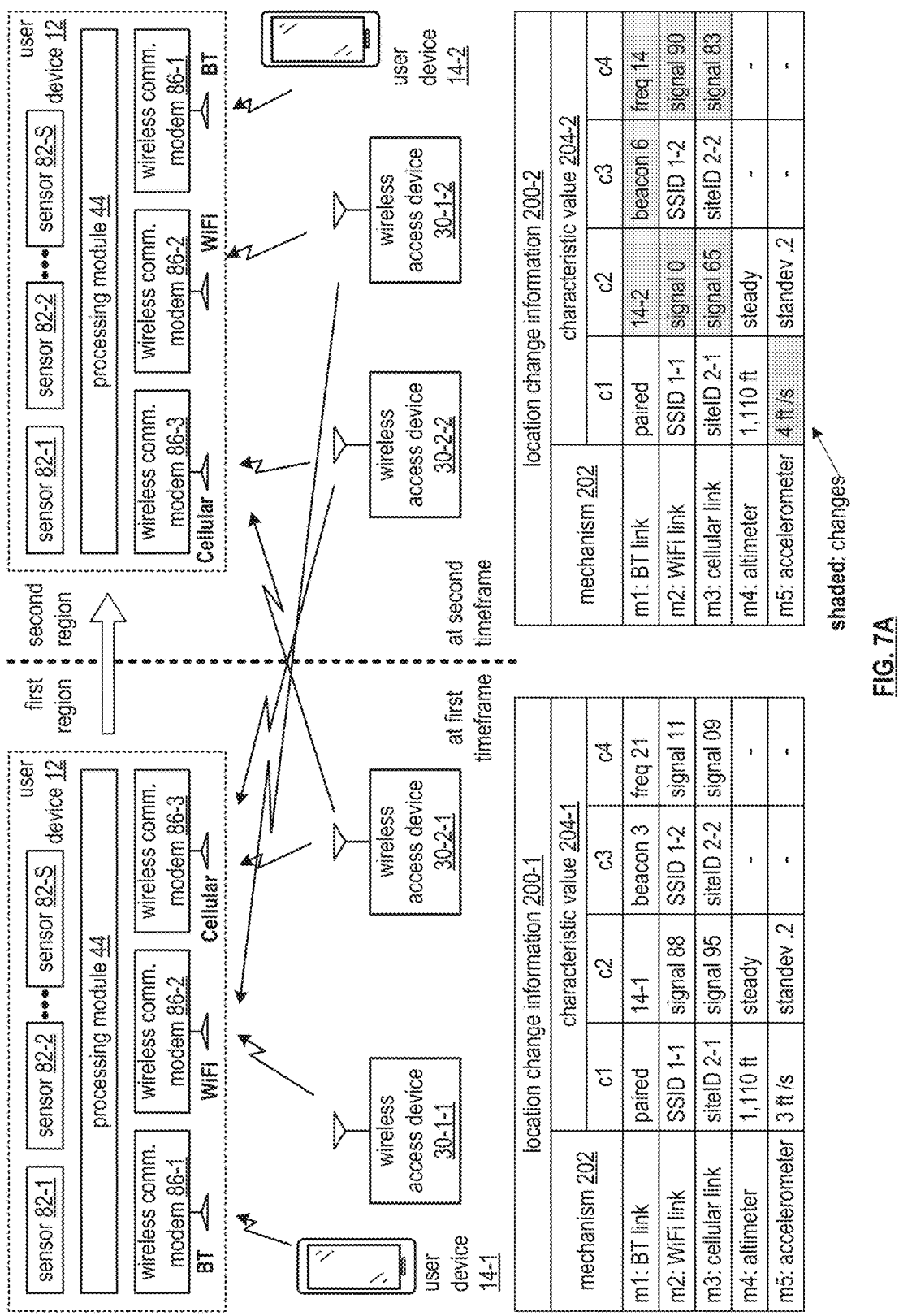
FIG. 7A is a schematic block diagram of another embodiment of a computing system in accordance with the present invention.

FIG. 7A is a schematic block diagram of another embodiment of a computing system that includes the user device 12 of FIG. 1, user devices 14-1 and 14-2, and an assortment of wireless access devices 30-1-1 and 30-1-2 along with 30-2-1 and 30-2-2. These are device 12 includes sensors 82-1 through 82-S, the processing module 44 of FIG. 3, and an assortment of wireless communication modems 86-1 through 86-3. The sensors 82-1 through 82-S may be implemented utilizing the sensor 82 of FIG. 3. The wireless communication modems 86-1 through 86-3 may be implemented utilizing the wireless communication modem 86 of FIG. 3, i.e., wireless communication modem 86-1 implemented with Bluetooth technology, wireless communication modem 86-2 implemented with Wi-Fi technology, and wireless communication modem 86-3 implemented with cellular technology. The user devices 14-1 and 14-2 may be implemented utilizing the user device 14 of FIG. 1. The assortment of wireless access devices may be implemented utilizing the wireless access device 30 of FIG. 1.

Generally, an embodiment of this invention presents solutions where the computing system 10 supports detecting a region change of the user device 12. For example, in a first time frame the user device 12 is associated with a first region (e.g., a geographic region or other) and in a second time frame, the user device 12 is associated with a second region. The region includes a portion of geography associated with one or more of a hemisphere, a continent, a country, a state, a county, a city, a neighborhood, a property, a building, a room, etc. The region may further include a proximity within a static or dynamically located object. For example, a region may include a 20 foot diameter around a vehicle that is moving from one city to the next.

The detecting of the region change of the user device 12 is based on obtaining and analyzing location change information. For example, differences between location change information 200-1 associated with the first region at the first time frame and location change information 200-2 associated with the second region at the second time frame drives decision-making to indicate region affiliation of the user device 12.

The location change information includes one or more characteristic values of one or more location mechanisms. The location mechanisms that includes one or more of a wireless communication link, an altimeter sensor output, an accelerometer sensor output, a barometer sensor output, a temperature sensor output, an image sensor output, a global positioning satellite (GPS) location modem output, and a user interface output (e.g., to capture a user input). The one or more characteristic values includes a sensor output value, a wireless device pairing status, a wireless link connectivity status, a paired wireless device identifier (ID), a wireless signal level, a wireless link error rate and, wireless site ID, a wireless frequency, a wireless link beacon ID, a GPS location, an associated geographic region ID, and a status of the user device 12. (e.g., emergency alarm coded to a location).

In an example of operation of the detecting of the region change, the processing module 44 receives outputs from the sensors 82-1 through 82-S and monitors operational aspects of the assortment of wireless communication modems 86-1 through 86-3 to produce the location change information 200-1. The location change information 200-1 includes mechanisms 202 (e.g., Bluetooth link, Wi-Fi link, cellular link, altimeter sensor output, accelerometer sensor output) and characteristic values 204-1 (e.g., characteristics 1-4 or more). For instance, the processing module 44 indicates that the Bluetooth link is paired with user device 14-1 utilizing a beacon number three and a frequency number 21.

At the second time frame subsequent to the first time frame, the processing module 44 collects further output from the sensors 82-1 through 82-S and further monitors the operational aspects of the assortment of the wireless location modems 86-1 through 86-3 to produce the location change information 200-2. The location change information 200-2 includes the same mechanisms 202 but with different updated characteristic values 204-2. For instance, the processing module 44 indicates that the Bluetooth link is now paired with user device 14-2 utilizing a beacon number six and a frequency number 14.

Having selected the updated characteristic values of the mechanisms to produce the location change information 200-2, the processing module 44 compares characteristic values 204-2 to the characteristic values 204-1 to produce a comparison. For example, the processing module 44 discovers changes for the Bluetooth link that includes pairing with a different user device, utilizing a different beacon and utilizing a different frequency. As another example, the processing module 44 discovers changes for the Wi-Fi link where the wireless access device 30-1-1 of the first time frame is no longer visible in the second time frame but the wireless access device 30-1-2 is visible with a signal characteristic value of 90. As yet another example, the processing module 44 discovers changes for the cellular link where the signal level characteristic of the site ID 2-1 (e.g., wireless access device 30-2-1) has fallen from 95 in the first time frame to 65 in the second time frame and the signal level characteristic of the site ID 2-2 (e.g., wireless access device 30-2-2) has risen from 09 in the first time frame to 83 in the second time frame.

Having produced the comparison, the processing module 44 determines whether the user device 12 is still located within the first region during the second time frame based on the comparison and a comparison approach of a plurality of comparison approaches. The plurality of comparison approaches includes a weighted characteristic approach where weighting factors are assigned to each characteristic for multiplication by a characteristic difference value of the comparison to produce an interim value and adding up the interim values to produce a score for comparison to scoring thresholds. A high priority characteristic approach includes prioritizing a key characteristic such that a corresponding characteristic difference that is greater than a minimum threshold value independently causes indication of a region change.

In a first instance, the processing module 44 indicates egress from the first region to the second region when multiple Wi-Fi wireless access devices dropout that are associated with the first region and one or more Wi-Fi wireless access devices appear that are associated with the second region. In a second instance, the processing module 44 indicates the egress from the first region to the second region when signal levels associated with cellular communication sites of the first region are lower in the second time frame and signal levels associated with cellular communication sites of the second region are higher and the second time frame. In a third instance, the processing module 44 indicates egress from the first region to the second region when an altimeter sensor output indicates a rapid elevation increase of 20 feet, where the first and second regions are associated with two adjacent floors of a high-rise building.

Figure 7B:
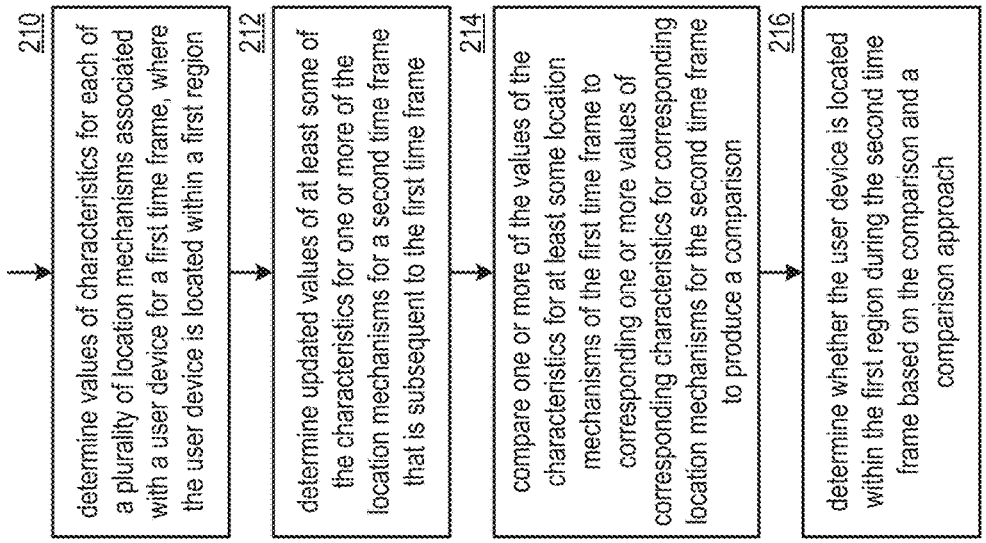
FIG. 7B is a logic diagram of an embodiment of a method of detecting a user device geographic region change in a computing system in accordance with the present invention.

FIG. 7B is a logic diagram of an embodiment of a method of detecting a user device geographic region change. In particular, a method is presented for use in conjunction with one or more functions and features described in conjunction with FIGS. 1-6, and also FIG. 7A. The method includes step 210 where a processing module of one or more processing modules of one or more computing devices of the computing system determines values of characteristics for each of a plurality of location mechanisms associated with a user device for a first time frame, where the user device is located within a first region. For example, the processing module gathers characteristic values from one or more sensors and from one or more wireless communication modems.

The method continues at step 212 where the processing module determines updated values of at least some of the characteristics for one or more of the location mechanisms for a second time frame that a subsequent to the first time frame. For example, the processing module initiates determining based on one or more of detection of the second time frame, a timer has expired, and detection of a refresh trigger (e.g., at least one new value of a characteristic that is greater than a change threshold level). For example, the processing module gathers new values from the one or more sensors and from the one or more wireless location modems.

The method continues at step 214 where the processing module compares one or more of the values of the characteristics for at least some location mechanisms of the first time frame to the corresponding one or more values of corresponding characteristics for a corresponding location mechanisms for the second time frame to produce a comparison. For example, the processing module calculates a difference between values of a similar characteristic of a similar mechanism.

The method continues at step 216 where the processing module determines whether the user devices located within the first region during the second time frame based on the comparison and a comparison approach. For example, the processing module indicates that the user device is not located within the first region when a score from the comparison utilizing the weighted comparison approach is unfavorable (e.g., many differences in characteristic values that point to a new region). Alternatively, or in addition to, the processing module indicates a new region when the characteristic values associated with a second time frame are favorably associated with a particular new region.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIGS. 8A-C are schematic block diagrams of another embodiment of a computing system that includes the user device 12 of FIG. 1, a wireless access device 30-2-1, and the control server 18 of FIG. 1. The wireless access device 30-2-1 may be implemented utilizing the wireless access device 30 of FIG. 1. Generally, an embodiment of this invention presents solutions where the computing system 10 supports communicating location change information.

FIG. 8A illustrates a first step of an example of the communicating the location change information where the user device 12, having already obtained the location change information 200-1 of FIG. 7A for the first region at a time frame t0, obtains the location change information 200-2 for the second region at a time frame t1. Having obtained the location change information 200-2, the user device 12 determines to report at least a portion of the location change information 200-2 (e.g., to the control server 18). The location change information may include one or more portions associated with various characteristics and location mechanisms. For example, a portion (a) may pertain to wireless communication links, a portion (b) may pertain to sensors of the user device 12, and a portion (c) may pertain to an output of a user input device of the user device 12.

FIG. 8B illustrates a next step of the example of the communicating the location change information where the user device 12 sends, via the wireless access device 30-2-1, the location change information 200-2 to the control server 18 utilizing an initial communication approach 230. The initial communication approach 230 is in accordance with one or more objectives such as minimal delay, minimal complexity, minimal cost while compromising the integrity of complete message delivery. More particularly, the user device 12 selects the initial communication approach 230 with latency of delivery, data volume of the location change information, and unconfirmed delivery to favorably support the one or more objectives. Unconfirmed delivery includes a data delivery service using best effort to deliver a message but without certainty of delivery.

For instance, the user device 12 sends the three portions of the location change information in three different wireless messages via the wireless access device 30-2-1 utilizing a cellular unstructured supplementary data service (USSD). The USSD is known to provide fast data transfer utilizing small packets for a small amount of data that is sent on securely with unconfirmed delivery providing a simple means to transfer data at a relatively low cost. However, with all unconfirmed delivery mechanisms, failure of communicating even a portion of the message may result in not communicating the message. For example, the location change information may not be communicated to the control server 18 when a USSD message carrying the LCI b portion fails.

Subsequent to the sending the location change information, the user device assigns a priority level of the location change information. The user device 12 may determine the priority level or may utilize a default priority level based on a condition (e.g., status of the user device 12).

FIG. 8C illustrates a next step of the example of the communicating the location change information where, when the priority level of the location change information is greater than a priority threshold, the user device 12 selects a new communication approach 240 to retransmit the location change information 200-2 to the control server 18. The new communication approach 240 is in accordance with one or more new objectives such as complete message delivery while compromising message delay and complexity. More particularly, the user device 12 selects the new communication approach 240 with confirmed delivery and associated latency of delivery and data volume to favorably support the one or more new objectives.

For instance, the user device 12 selects the new communication approach 240 to include a cellular TLS (transport layer security) data service, where large amounts of data can be communicated securely with confirmed delivery albeit with a slower message delivery latency as compared to the initial communication approach 230. For example, the TLS data service includes a session start exchange 242 (e.g., to request a TLS session), a protocol exchange 244 (e.g., to communicate supported protocols), a security exchange 246 (e.g., to facilitate arriving at a common session key to encrypt data), sending of the payload (e.g., location change information 200-2 in its entirety over a cellular data resource), and wrapping up with a session and exchange 248 (e.g., to facilitate closing the session).

FIG. 8D is a logic diagram of an embodiment of a method of communicating location change information change within a computing system. In particular, a method is presented for use in conjunction with one or more functions and features described in conjunction with FIGS. 1-6, and also FIGS. 7A-C. The method includes step 260 where a processing module of one or more processing modules of one or more computing devices of the computing system determines to report location change information of a first computing device to a second computing device.

The determining to report the location change information of the first computing device to the second computing device includes a variety of reporting approaches. A first reporting approach includes generating the location change information to include an identifier of the first computing device and a first characteristic value of a plurality of characteristics values associated with a first location mechanism of a plurality of location mechanisms. For example, the processing module gathers wireless link status and computing device sensors status.

A second reporting approach includes detecting a possible geographic region change based on the location change information. For example, the processing module interprets changes in the location change information to detect the possible geographic region change.

A third reporting approach includes detecting a potential loss of communications. For example, the processing module identifies a downward trend in wireless communication link signal strength.

A fourth reporting approach includes detecting that a current location is different by more than a difference threshold from a previous location. For example, the processing module detects that the first computing device has moved 25 feet from the previous location and the difference threshold is 20 feet.

A fifth reporting approach includes detecting that a location reporting time frame has expired. For example, the processing module detects expiration of a timer associated with the location reporting time frame.

The method continues at step 262 where the processing module sends the location change information to the second computing device utilizing an initial communication approach. The initial communication approach includes at least one of first latency, first data volume, and unconfirmed delivery.

The sending the location change information to the second computing device utilizing the initial communication approach includes a series of steps. A first step includes obtaining an objective of the initial communication approach. The objectives includes minimizing message delivery delay, minimizing power utilization and allowing a compromise of message delivery. The obtaining of the objective includes one or more of retrieving a default objective, interpreting a request, and interpreting historical communication results to identify a satisfactory objective.

A second step of the sending the location change information includes selecting the initial communication approach from a plurality of communication approaches based on the objective of the initial communication approach and the location change information. The first latency, the first data volume, and the unconfirmed delivery favorably support the objective of the initial communication approach. For example, the processing module selects a cellular unstructured supplementary data service (USSD) with 1 repeat cycle and divides the location information into a plurality of messages when the location change information includes over 1,000 bytes but less than 10,000 bytes. As another example, the processing module selects a cellular user datagram protocol (UDP) data service when over 10,000 bytes and reliability of message delivery is not important.

A third step of the sending the location change information includes transmitting the location change information to the second computing device using the initial communication approach. For example, the processing module divides the location change information between sub-messages, utilizes unconfirmed and non-queued data delivery, and use repeats to improve probability of full information received, i.e., via USSD, not store-and-forward, not confirmed delivery.

Subsequent to the sending the location change information, the method continues at step 264 where the processing module assigns a priority level of the location change information based on one or more environmental parameters. The environmental parameters includes one or more of first computing device location, schedule adherence of the first computing device, estimated future location of the first computing device, communication loss eminent with the first computing device, and emergency status associated with the first computing device, and the second computing device did not receive all of the location change information.

The assigning the priority level of the location change information based on the one or more environmental parameters includes establishing the priority level of the location change information to be greater than the priority threshold when detecting at least one of a variety of conditions of the one or more environmental parameters. The conditions includes an unfavorable current location (e.g., a dangerous area), unfavorable schedule adherence (e.g., off route, behind schedule, ahead of schedule), and an unfavorable motion trajectory. An instance of the unfavorable motion trajectory includes an Alzheimer's patient walking out of a care facility and towards a lake in the middle of the night.

The conditions further includes a potential loss of communications (i.e., a high priority condition when the first computing device is moving away from reliable communications) and an unfavorable status of the first computing device (e.g., emergency alarm). The conditions still further includes an unfavorable response from the second computing device and an acknowledgment timeframe has expired with a receiving a response from the second computing device. The unfavorable response includes one or more of a request for more information, a resend request, and an instruction not to go to sleep (e.g., when unknowingly entering into a dangerous area etc.).

The method continues at step 266 where the processing module determines whether the priority level of the location change information is greater than a priority threshold. For example, the processing module retrieves the priority threshold or determines the priority threshold based on at least some of the location change information, i.e., a status of the first computing device, and compares the priority level of the location change information to the priority threshold to produce a comparison. The method branches to step 272 when the priority level of the location change information is not greater than the priority threshold. The method continues to step 268 when the priority level of the location change information is greater than the priority threshold.

When the priority level of the location change information is greater than a priority threshold, the method continues at step 268 where the processing module selects a new communication approach for retransmission of at least a portion of the location change information. The new communication approach includes at least one of second latency, second data volume, and confirmed delivery, wherein the first latency is less than the second latency, and the first data volume is less than the second data volume.

The selecting the new communication approach for retransmission of the at least a portion of the location change information includes one or more selection approaches. A first selection approach includes obtaining an objective of the new communication approach. The obtaining the objective includes one or more of retrieving a default, interpreting a request, and interpreting historical communication results.

A second selection approach includes selecting the new communication approach from a plurality of communication approaches based on the objective of the new communication approach and the location change information. The second latency, the second data volume, and the confirmed delivery favorably support the objective of the new communication approach. For example, the processing module selects a cellular data service with confirmed delivery and selects an IP protocol (e.g., TLS) to provide favorable security when the objectives include allowing a greater level of message latency and allowing a larger data payload for the seller data service.

A third selection approach includes identifying the at least a portion of the location change information based on incomplete delivery of the location change information utilizing the initial communication approach. For example, the processing module interprets an incomplete delivery indicator. As another example, the processing module estimates which portion based on an aspect of the initial communication approach.

The method continues at step 270 where the processing module resends the at least a portion of the location change information to the second computing device using the new communication approach. A desired percentage (e.g., >10%) of a plurality of location change information (e.g., sent over time) will have a priority level that is less than or equal to the priority threshold (e.g., allowable to always try unconfirmed delivery first), where the plurality of location change information includes the location change information.

The resending the at least a portion of the location change information to the second computing device using the new communication approach includes a series of steps. A first step includes transmitting the at least a portion of the location change information to the second computing device using the new communication approach. For example, the processing module resends utilizing a message queue telemetry transport (MQTT) protocol over the TLS session.

A second step of the resending includes, when the desired percentage of the plurality of location change information does not have the priority level that is less than or equal to the priority threshold, the processing module updating the priority threshold such that the desired percentage of the plurality of location change information will have the priority level that is less than or equal to the priority threshold. For instance, the processing module raises the threshold when too many communication attempts of sending the location change information have to advance to use of the new communication approach.

When the priority level of the location change information is less than the priority threshold, the method continues at step 272 where the processing module detects an unfavorable likelihood level of communicating the location change information to the second computing device utilizing the initial communication approach. The processing module detects the unfavorable likelihood level based on one or more of historical records, deducing no acknowledgment within an acknowledgment time frame, receiving an indication that a portion of the location change information was not received, determining a probability level of favorable communications, and comparing to a minimum probability threshold level.

As a specific example of detecting the unfavorable likelihood level, the processing module receives an indicator from the second computing device that one of three messages was not received. As another specific example of detecting an unfavorable likelihood level, the processing module identifies an unfavorable reliability trend from the historical records of utilizing the particular initial communication approach to the particular second computing device.

When detecting the unfavorable likelihood level of communicating the location change information to the second computing device, the method continues at step 274 where the processing module selects the new communication approach for retransmission of the at least a portion of the location change information. The method continues at step 276 where the processing module resends the at least a portion of the location change information to the second computing device using the new communication approach.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 9A is a schematic block diagram of another embodiment of a computing system that includes the user device 12 and the control server 18 of FIG. 1. The control server 18 includes the processing module 44 of FIG. 1. Generally, an embodiment of this invention presents solutions where the computing system 10 supports resolving conflicting location information from the user device 12.

In an example of operation to resolve the conflicting location information, the processing module 44 of the control server 18 receives a location change information for a plurality of time frames 1-N. For example, the processing module 44 receives location change location change information 200-7 and 200-8 for two of the time frames from the user device 12. The location change information has a format as previously discussed in greater detail with reference to FIG. 7A. For example, the location change information 200-7 includes characteristic values 204-7 for each the mechanisms 202 for the first of the two time frames and location change information 200-8 includes characteristic values 204-8 for each the mechanisms 202 for the second of the two time frames.

Having obtained the location change information for the plurality of time frames, the processing module 44 identifies at least one conflict between characteristic values for similar mechanisms between the at least two of the sets of location change information. For example, when identifying a false positive location change, the processing module 44 identifies one characteristic that has changed indicating motion but that conflicts with multiple other characteristics that did not change or did not change very much. For instance, the processing module 44 identifies a characteristic value change of a GPS receiver indicating that the user device 12 has moved several miles south but characteristics from Wi-Fi and cellular wireless communication modems are not consistent with the user device 12 moving several miles (e.g., same wireless site identifiers and similar signal strengths).

Having identified the conflict, the processing module 44 selects a resolution approach to resolve the conflict. The resolution approaches includes de-bouncing values of conflicting characteristics, performing a majority vote on a location indicator, and determining a location based on weighting each location mechanism. The selecting may be in accordance with which location mechanisms are conflicting.

For example, since GPS receivers are known to glitch and report a movement when there really is no movement, the de-bouncing approach is selected. As another example, since it is known that wireless signals are subject to a phenomenon called fading, the weighting of the characteristic values associated with wireless signal strength is applied to resolve the conflict when the location mechanism of the conflict is a wireless signal strength.

Having selected the resolution approach, the processing module 44 applies the resolution approach to the conflicting location information to produce modified location change information for one or more of the time frames 1-N. For example, when utilizing the de-bouncing approach for the GPS characteristic values, the processing module 44 modifies the GPS characteristic values of the second time frame to be the same as the first time frame when a majority of the other characteristics of the other mechanisms indicate that the user device 12 has not moved (e.g., slight variance in wireless signal strengths that is less than a variance threshold).

FIG. 9B is a logic diagram of an embodiment of a method of resolving conflicting location information within a computing system. In particular, a method is presented for use in conjunction with one or more functions and features described in conjunction with FIGS. 1-6, and also FIG. 9A. The method includes step 310 where a processing module of one or more processing modules of one or more computing devices of the computing system obtains location change information for a plurality of time frames from a user device. The location change information includes values of one or more characteristics of one or more location mechanisms. The obtaining includes one or more of issuing a request, receiving a response, retrieving from the database, and gathering the location change information, i.e., locally by the user device.

The method continues at step 312 where the processing module identifies an aspect of the location change information for a first time frame that conflicts with a similar aspect of the location change information for a second time frame to produce conflicting location information. The identifying includes identifying two characteristic values for a common location mechanism that indicates the location change when characteristic values for another location mechanism does not indicate the location change. For example, detecting that GPS data indicates rapid movement but cellular sites and Wi-Fi access points have about the same signal strength for the same sites across the two time frames.

The method continues at step 314 where the processing module selects a resolution approach to abate the conflicting location information. The selecting may be based on one or more of which location mechanism is conflicting, historical correctness performance, and indications from other user devices associated with similar location information. For example, the processing module may request a portion of location change information associated with another user device that is known to be near the user device of the conflict.

The method continues at step 316 where the processing module applies the resolution approach to the conflicting location information to produce modified location change information. The applying includes modifying one or more values of the characteristics associated with the conflicting location information in accordance with the resolution approach. For example, the processing module modifies a GPS aspect to be consistent with another time frame when other characteristic values of other location mechanism suggest a similar location to abate the conflict.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 10A is a schematic block diagram of another embodiment of a computing system that includes a plurality of user devices 12-1 through 12-7 operating within and between a plurality of trusted regions one through four. The user devices 12-1 through 12-7 may be implemented utilizing the user device 12 of FIG. 1. Generally, an embodiment of this invention presents solutions where the computing system 10 supports adapting modes of location information synchronization. The modes of location information synchronization pertain to combinations of a level of location resolution (e.g., a relative location to another object/device, an absolute location with an associated confidence interval, where a low resolution is associated with a wider confidence interval than a high resolution) and a level of frequency of updating the location information to a location information recipient (e.g., updating more often or less often, updating at a specific update rate).

In an example of operation to adapt the mode of location information synchronization, the user device detects a change in activity and/or motion associated with the user device, where the user device is to periodically issue location change information to the location information recipient in accordance with location updating requirements of the mode of the location information synchronization. The activities include resting, walking, running, bicycling, writing in one or more types of vehicles, etc. The activity may further include, when detecting movement, moving towards a known region including one of the trusted regions (e.g., associated with a trusted watcher). The user device detects the change in activity by interpreting changes in location change information associated with the user device for two or more time frames. For example, the user device 12-1 detects no change in activity when the location change information for the two or more time frames indicates that the user device 12-1 is within the trusted region 1. As an example, the user device 12-2 detects ingress from the trusted region two based on changes in its location change information.

Having detected the activity change, the user device determines activity characteristics associated with activity change. The characteristics includes one or more of resting in place versus moving and if moving a mode of movement (e.g., self or a vehicle). The characteristics further include, when moving, a velocity, the direction of travel, the travel route, a predicted destination, and estimated time of arrival at the predicted destination, the aggressor ingress of a trusted region, and a safety level. As an example, the user device 12-3 detects walking away at 3 mph in an east direction from the trusted region 1 based on its location change information. As another example, the user device 12-5 detects riding in a vehicle (e.g., at 60 mph) away from trusted region one but not moving towards any particular other trusted region.

In a contrasting example of determining activity characteristics, the user device 12-4 detects riding in another vehicle towards trusted region four based on its location change information at a speed of 65 miles per hour in a northeast direction. As another example, the user device 12-7 detects arriving in another vehicle at trusted region three based on the previous detection of activity (e.g., writing in the vehicle towards the trusted region three) and updated location change information indicating de-acceleration just outside of the trusted region three. In a final example, the user device 12-6 detects ingress to trusted region four based on its location change information aligning with coordinates of a boundary of the trusted region four.

Having determined the activity characteristics, the user device determines new location updating requirements based on the activity characteristics and the location change information associated with the user device. The user device updates one or more of the location update frequency and the location resolution level. For example, the user device maps and activity characteristic to a particular new update frequency. As another example, the user device switches to a very high location resolution level when receiving an emergency alarm from the user device. As yet another example, the user device raises the location update frequency when a parent is watching the location of the user device.

As a specific instance of determining the new location updating requirements, the user device 12-2 determines to perform location updates more often and with a higher resolution level when detecting the egress from the trusted region two. As another specific instance, the user device 12-3 determines to perform location updates more often and with a higher resolution level when detecting the walking away from the trusted region one. As a contrasting example, the user device 12-4 determines to perform the location updates less often and with a lower resolution when detecting that the user device 12-4 is writing in the vehicle towards the trusted region four (e.g., a "coast mode").

As a further specific example of determining the new location updating requirements, the user device 12-5 determines to perform the location updates more often and with a higher resolution level when detecting that the user device 12-5 is riding tin the vehicle away from the trusted region one but not towards any particular other trusted region. However, the user device 12-7 determines to perform the location updates more often but with a lower resolution level when detecting the arriving in the vehicle at the trusted region three. In a final example, having arrived at a safe location, the user device 12-6 determines to perform the location updates less often and at the lower resolution level when detecting the ingress to the trusted region four.

Having determined the new location updating requirements, the user device issues for the location change information to the location information recipient in accordance with the new location updating requirements. For example, the user device gathers updated location change information in accordance with the updated location update frequency and further in accordance with the updated location resolution level and sends the updated location change information to the location information recipient.

FIG. 10B is a logic diagram of an embodiment of a method of adapting modes of location information synchronization within a computing system. In particular, a method is presented for use in conjunction with one or more functions and features described in conjunction with FIGS. 1-6, and also FIG. 10A. The method includes step 340 where a processing module of one or more processing modules of one or more computing devices of the computing system detects an activity change associated with a user device, where the user device issues location change information to the location information recipient in accordance with location updating requirements. The detecting includes one or more of interpreting location change information associated with the user device for two or more time frames, receiving an input (e.g., receive an indication from a user of the user device that indicates that the user device is boarding a train), and receiving an updated location updating requirement (e.g., from a control server).

The method continues at step 342 where the processing module determines activity characteristics associated with the activity change. For example, the processing module interprets location change information to identify several activity characteristics. For instance, the processing module identifies a velocity of 75 miles per hour based on comparing location coordinates for two adjacent time frames. As another example, the processing module interprets a user input. For instance, the processing module receives an indication that the user device is exiting a vehicle and is associated with a walking user of the user device.

The method continues at step 344 where the processing module determines new location updating requirements based on the activity characteristics and location change information of the user device. The determining includes updating one or more of a location update frequency and a location resolution level based on the activity characteristics (e.g., mapping in accordance with predetermined rules, establishing in accordance with a paid service during level, overriding based on a user priority, i.e., a parent is watching).

In an instance of updating the new location updating requirements, the processing module performs updates more often when egressing from a trusted region or arriving at another trusted region. In another instance, the processing module performs the updates more often when detecting an abrupt motion potentially associated with a dangerous situation (e.g., a sharp curve in motion) and/or when unable to match location information to a valid location. In yet another instance, the processing module determines to perform the updates less often when within a trusted region, upon ingress to another trusted region, and/or when riding in a vehicle towards a known trusted region and the estimated time of arrival (ETA) is greater than an ETA threshold (e.g., the "coast mode").

The method continues at step 346 where the processing module facilitates the user device issuing further location change information to the location information recipient in accordance with the new location updating requirements. The facilitating includes one or more of providing location updating requirements to the user device and gathering updated location change information in accordance with the updated location of the frequency and in accordance with the updated location resolution level. The facilitating further includes issuing the updated location change information to the location information recipient.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 11A is a schematic block diagram of another embodiment of a computing system that includes the user devices 12 and 14 of FIG. 1, the wireless access device 30-2-1 of FIG. 7A, and the control server of FIG. 1. The user device 12 includes the wireless location modem 84 and the processing module 44 of FIG. 3. The user device 12 further includes the wireless communication modem 86-1 of FIG. 7A. The user device 14 includes the wireless location modem 84 and the processing module 44 of FIG. 2. The user device 14 further includes the wireless communication modems 86-1 and 86-3 of FIG. 7A. The control server 18 includes the processing module 44 of FIG. 1. Generally, an embodiment of this invention presents solutions where the computing system 10 supports verifying location information associated with the user device 12, where the user device 12 is a tract device, the user device 14 is a trusted watcher associated with the tracked device, and the control server 18 is a location information recipient.

In an example of operation of the verifying of the location information, the processing module 44 of the user device 14 determines trusted watcher location information for the user device 14. For example, the processing module 44 interprets an output from the wireless location modem 84 of the user device 14 to produce the trusted watcher location information (e.g., GPS coordinates).

Having determined the trusted watcher location information, the processing module 44 of the user device 14 issues a trusted watcher location information verification request to the tracked device, where the trusted watcher location information verification request includes the trusted watcher location information. For example, the processing module 44 generates the trusted watcher location information verification request to include the trusted watcher location information. The request further includes a request for verification and includes, when the trusted watcher location information is not verified, a request for tracked device location that is generated by the tracked device based on an output from the wireless location modem 84 of the user device 12. The issuing further includes facilitating sending, via the wireless communication modem 86-1, the trusted watcher location information verification request 360 to the tracked device, i.e., user device 12.

Having issued the trusted watcher location information verification request to the tracked device, when the trusted watcher location information is verified by the tracked device, the user device 14 generates tracked device location information based on the verified trusted watcher location information. For example, the processing module 44 of the user device 14 interprets the verification response 362 received, via the wireless communication modem 86-1 from the user device 12, and interprets a verification indicator. When verified, the processing module 44 generates the tracked device location information using the trusted watcher location information. On the other hand, when the trusted watcher location information is not verified by the tracked device, the user device 14 obtains the tracked device location information from the tracked device. For example, the processing module 44 of the user device 14 extracts the tracked device location information from the verification response 362.

Now having obtained the tracked device location information, the trusted watcher sends the tracked device location information to the location information recipient. For example, the processing module 44 of the user device 14 facilitates transmission, via the wireless location modem 86-3, the tracked device location information 364 to the processing module 44 of the control server 18.

FIG. 11B is a logic diagram of an embodiment of a method of verifying location information within a computing system. In particular, a method is presented for use in conjunction with one or more functions and features described in conjunction with FIGS. 1-6, and also FIG. 11A. The method includes step 380 where a processing module of one or more processing modules of one or more computing devices of the computing system determines trusted watcher location information for a trusted watcher device. For example, the processing module interprets an output from a GPS receiver associated with the trusted watcher device to produce the trusted watcher location information.

The method continues at step 382 where the processing module issues a trusted watcher location information verification request to tracked device, where the trusted watcher location information verification request includes the trusted watcher location information. For example, the processing module generates the trusted watcher location information verification request to include the trusted watcher information and a request for verification. The request further includes a request for tracked device location information when the trusted watcher location information compares unfavorably to the tracked device location information (e.g., not verified). The tracked device generates the tracked device location information indicating location information associated with the tracked device.

The method continues at step 384 the processing module receives a response to the trusted watcher location information verification request. For example, the processing module receives a response that indicates that the trusted watcher location information is verified when the trusted watcher location information compares favorably to the tracked device location information. As another example, the processing module receives another response that indicates that the trusted watcher location information is not verified when the other response includes the tracked device location information that is generated by the tracked device. The method branches to step 388 when the trusted watcher location information is not verified. The method continues to step 386 when the trusted watcher location information is verified.

When the trusted watcher location information is verified, the method continues at step 386 for the processing module generates tracked device location information based on the trusted watcher location information. For example, the processing module interprets the response from the tracked device to identify a verification indicator and when verified, generates the tracked device location information using the trusted watcher location information. The method branches to step 390.

When the trusted watcher location information is not verified, the method continues at step 388 where the processing module obtains the tracked device location information from the tracked device. For example, the processing module extracts the tracked device location information from the response. As another example, the processing module issues a further request to the tracked device to request the tracked device location information and receives another response that includes the tracked device location information. As yet another example, the processing module updates the trusted watcher location information in accordance with one or more error indicators extracted from the response from the tracked device, where an error indicator identifies a particular portion of the trusted watcher location information but is not substantially match the tracked device location information and further indicates a recommended amendment to the portion of the trusted watcher location information.

The method continues at step 390 where the processing module sends the tracked device location information to a location information recipient. For example, the processing module facilitates transmission of the tracked device location information to the location information recipient. Alternatively, or in addition to, the processing module sends the tracked device location information to the tracked device for yet another confirmation cycle as described above.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    determining, by a first computing device, to report location change information of the first computing device to a second computing device;
    sending, by the first computing device, the location change information to the second computing device utilizing an initial communication approach, wherein the initial communication approach includes at least one of first latency, first data volume, and unconfirmed delivery;

subsequent to the sending the location change information, assigning, by the first computing device, a priority level of the location change information based on one or more environmental parameters; and when the priority level of the location change information is greater than a priority threshold:
  selecting, by the first computing device, a new communication approach for retransmission of at least a portion of the location change information, wherein the new communication approach includes at least one of second latency, second data volume, and confirmed delivery, wherein the first latency is less than the second latency, and the first data volume is less than the second data volume; and
  resending, by the first computing device, the at least a portion of the location change information to the second computing device using the new communication approach, wherein a desired percentage of a plurality of location change information will have a priority level that is less than or equal to the priority threshold, wherein the plurality of location change information includes the location change information.

2. The method of claim 1 further comprises:
when the priority level of the location change information is less than the priority threshold:
  detecting, by the first computing device, an unfavorable likelihood level of communicating the location change information to the second computing device utilizing the initial communication approach; and
  when detecting the unfavorable likelihood level of communicating the location change information to the second computing device:
    selecting, by the first computing device, the new communication approach for retransmission of the at least a portion of the location change information; and
    resending, by the first computing device, the at least a portion of the location change information to the second computing device using the new communication approach.

3. The method of claim 1, wherein the location change information comprises:
one or more characteristic values of one or more location mechanisms, wherein:
  the one or more location mechanisms includes:
    a wireless communication link;
    an altimeter sensor output;
    an accelerometer sensor output;
    a barometer sensor output;
    a temperature sensor output;
    an image sensor output;
    a global positioning satellite (GPS) location modem output; and
    a user interface output; and
  the one or more characteristic values includes:
    a sensor output value;
    a wireless device pairing status;
    a wireless link connectivity status;
    a paired wireless device identifier (ID);
    a wireless signal level;
    a wireless link error rate;
    a wireless site ID;
    a wireless frequency;
    a wireless link beacon ID;
    a GPS location;
    an associated geographic region ID; and
    a status of the first computing device.

4. The method of claim 1, wherein the determining to report the location change information of the first computing device to the second computing device comprises one or more of:
  generating the location change information to include an identifier of the first computing device and a first characteristic value of a plurality of characteristics values associated with a first location mechanism of a plurality of location mechanisms;
  detecting a possible geographic region change based on the location change information;
  detecting a potential loss of communications;
  detecting that a current location is different by more than a difference threshold from a previous location; and
  detecting that a location reporting time frame has expired.

5. The method of claim 1, wherein the sending the location change information to the second computing device utilizing the initial communication approach comprises:
  obtaining an objective of the initial communication approach;
  selecting the initial communication approach from a plurality of communication approaches based on the objective of the initial communication approach and the location change information,
  wherein the first latency, the first data volume, and the unconfirmed delivery favorably support the objective of the initial communication approach; and
  transmitting the location change information to the second computing device using the initial communication approach.

6. The method of claim 1, wherein the assigning the priority level of the location change information based on the one or more environmental parameters comprises:
  establishing the priority level of the location change information to be greater than the priority threshold when detecting at least one of:
    an unfavorable current location;
    unfavorable schedule adherence;
    an unfavorable motion trajectory;
    a potential loss of communications;
    an unfavorable status of the first computing device;
    an unfavorable response from the second computing device; and
    an acknowledgment timeframe has expired without receiving a response from the second computing device.

7. The method of claim 1, wherein the selecting the new communication approach for retransmission of the at least a portion of the location change information comprises one or more of:
  determining that the priority level of the location change information is greater than the priority threshold;
  obtaining an objective of the new communication approach;
  selecting the new communication approach from a plurality of communication approaches based on the objective of the new communication approach and the location change information, wherein the second latency, the second data volume, and the confirmed delivery favorably support the objective of the new communication approach; and identifying the at least a portion of the location change information based on incomplete delivery of the location change information utilizing the initial communication approach.

8. The method of claim 1, wherein the resending the at least a portion of the location change information to the second computing device using the new communication approach comprises:
   transmitting the at least a portion of the location change information to the second computing device using the new communication approach; and
   when the desired percentage of the plurality of location change information does not have the priority level that is less than or equal to the priority threshold:
      updating the priority threshold such that the desired percentage of the plurality of location change information will have the priority level that is less than or equal to the priority threshold.

9. A computer readable memory comprises:
   a first memory element that stores operational instructions that, when executed by a processing module causes the processing module to:
      determine to report location change information of a first computing device to a second computing device;
   a second memory element that stores operational instructions that, when executed by the processing module causes the processing module to:
      send the location change information to the second computing device utilizing an initial communication approach, wherein the initial communication approach includes at least one of first latency, first data volume, and unconfirmed delivery;
   a third memory element that stores operational instructions that, when executed by the processing module causes the processing module to:
      subsequent to the sending the location change information, assign a priority level of the location change information based on one or more environmental parameters; and
   a fourth memory element that stores operational instructions that, when executed by the processing module causes the processing module to:
      when the priority level of the location change information is greater than a priority threshold:
         select a new communication approach for retransmission of at least a portion of the location change information, wherein the new communication approach includes at least one of second latency, second data volume, and confirmed delivery, wherein the first latency is less than the second latency, and the first data volume is less than the second data volume; and
         resend the at least a portion of the location change information to the second computing device using the new communication approach, wherein a desired percentage of a plurality of location change information will have a priority level that is less than or equal to the priority threshold, wherein the plurality of location change information includes the location change information.

10. The computer readable memory of claim 9 further comprises:
   the fourth memory element stores further operational instructions that, when executed by the processing module, causes the processing module to:
      when the priority level of the location change information is less than the priority threshold:
         detect an unfavorable likelihood level of communicating the location change information to the second computing device utilizing the initial communication approach; and
         when detecting the unfavorable likelihood level of communicating the location change information to the second computing device:
            select the new communication approach for retransmission of the at least a portion of the location change information; and
            resend the at least a portion of the location change information to the second computing device using the new communication approach.

11. The computer readable memory of claim 9, wherein the location change information comprises:
   one or more characteristic values of one or more location mechanisms, wherein:
      the one or more location mechanisms includes:
         a wireless communication link;
         an altimeter sensor output;
         an accelerometer sensor output;
         a barometer sensor output;
         a temperature sensor output;
         an image sensor output;
         a global positioning satellite (GPS) location modem output; and
         a user interface output; and
      the one or more characteristic values includes:
         a sensor output value;
         a wireless device pairing status;
         a wireless link connectivity status;
         a paired wireless device identifier (ID);
         a wireless signal level;
         a wireless link error rate;
         a wireless site ID;
         a wireless frequency;
         a wireless link beacon ID;
         a GPS location;
         an associated geographic region ID; and
         a status of the first computing device.

12. The computer readable memory of claim 9, wherein the processing module functions to execute the operational instructions stored by the first memory element to cause the processing module to determine to report the location change information of the first computing device to the second computing device by one or more of:
   generating the location change information to include an identifier of the first computing device and a first characteristic value of a plurality of characteristics values associated with a first location mechanism of a plurality of location mechanisms;
   detecting a possible geographic region change based on the location change information;
   detecting a potential loss of communications;
   detecting that a current location is different by more than a difference threshold from a previous location; and
   detecting that a location reporting time frame has expired.

13. The computer readable memory of claim 9, wherein the processing module functions to execute the operational instructions stored by the second memory element to cause the processing module to send the location change information to the second computing device utilizing the initial communication approach by:
   obtaining an objective of the initial communication approach;

selecting the initial communication approach from a plurality of communication approaches based on the objective of the initial communication approach and the location change information, wherein the first latency, the first data volume, and the unconfirmed delivery favorably support the objective of the initial communication approach; and transmitting the location change information to the second computing device using the initial communication approach.

14. The computer readable memory of claim 9, wherein the processing module functions to execute the operational instructions stored by the third memory element to cause the processing module to assign the priority level of the location change information based on the one or more environmental parameters by:

establishing the priority level of the location change information to be greater than the priority threshold when detecting at least one of:
an unfavorable current location;
unfavorable schedule adherence;
an unfavorable motion trajectory;
a potential loss of communications;
an unfavorable status of the first computing device;
an unfavorable response from the second computing device; and
an acknowledgment timeframe has expired without receiving a response from the second computing device.

15. The computer readable memory of claim 9, wherein the processing module functions to execute the operational instructions stored by the fourth memory element to cause the processing module to select the new communication approach for retransmission of the at least a portion of the location change information by one or more of:

determining that the priority level of the location change information is greater than the priority threshold;
obtaining an objective of the new communication approach;
selecting the new communication approach from a plurality of communication approaches based on the objective of the new communication approach and the location change information, wherein the second latency, the second data volume, and the confirmed delivery favorably support the objective of the new communication approach; and
identifying the at least a portion of the location change information based on incomplete delivery of the location change information utilizing the initial communication approach.

16. The computer readable memory of claim 9, wherein the processing module functions to execute the operational instructions stored by the fourth memory element to cause the processing module to resend the at least a portion of the location change information to the second computing device using the new communication approach by:

transmitting the at least a portion of the location change information to the second computing device using the new communication approach; and
when the desired percentage of the plurality of location change information does not have the priority level that is less than or equal to the priority threshold:
updating the priority threshold such that the desired percentage of the plurality of location change information will have the priority level that is less than or equal to the priority threshold.

* * * * *